United States Patent
Sehn et al.

(10) Patent No.: US 10,223,397 B1
(45) Date of Patent: Mar. 5, 2019

(54) SOCIAL GRAPH BASED CO-LOCATION OF NETWORK USERS

(71) Applicant: Snap Inc., Santa Monica, CA (US)

(72) Inventors: Timothy Michael Sehn, Marina Del Rey, CA (US); Aaron Son, Venice, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 14/658,115

(22) Filed: Mar. 13, 2015

(51) Int. Cl.
 *G06F 17/30* (2006.01)
 *H04L 29/08* (2006.01)
 *H04L 12/26* (2006.01)

(52) U.S. Cl.
 CPC .... *G06F 17/30342* (2013.01); *H04L 43/0882* (2013.01); *H04L 67/22* (2013.01)

(58) Field of Classification Search
 CPC ............... G06Q 50/01; G06Q 10/0633; G06Q 30/0251; G06Q 50/10; G06F 3/048; G06F 17/30277; G06F 17/30702; G06F 17/30867; G06F 17/3053; G06F 17/30386; G06F 3/013; G06F 3/048204; H04N 21/4334; H04N 21/47214; H04N 21/478; H04N 21/4788; H04N 21/632; H04W 4/028; H04W 4/08; H04W 4/02; H04W 4/021; H04W 4/023
 See application file for complete search history.

(56) References Cited

U.S. PATENT DOCUMENTS

| 666,223 A | 1/1901 | Shedlock |
| 4,581,634 A | 4/1986 | Williams |
| 4,975,690 A | 12/1990 | Torres |

(Continued)

FOREIGN PATENT DOCUMENTS

| CA | 2887596 A1 | 7/2015 |
| EP | 2051480 A1 | 4/2009 |

(Continued)

OTHER PUBLICATIONS

Leyden, John, "This SMS will self-destruct in 40 seconds", [Online]. Retrieved from the Internet: <URL: http://www.theregister.co.uk/2005/12/12/stealthtext/, (Dec. 12, 2005), 1 pg.

(Continued)

*Primary Examiner* — Augustine K. Obisesan
(74) *Attorney, Agent, or Firm* — Schwegman Lundberg & Woessner, P.A.

(57) ABSTRACT

User activity in a communication network is monitored to obtain social graph data for each user. This social graph data is used to cluster the users into groups of users that interact with each other regularly. The groups are analyzed to generate a profile for each group with respect to a set of relevant data points. The profiles can be based on identifying group social graph data that is related to a data point (e.g., user activity level) that is being used to provision network server resources. The profile for each group is then compared to corresponding data associated with a plurality of servers providing network services to the users. Each group is then assigned to one or more of the servers that best matches the profile of the group. Servers may be added to the network by comparing data regarding a proposed new server to existing group profiles.

12 Claims, 8 Drawing Sheets

(56) References Cited

U.S. PATENT DOCUMENTS

| | | |
|---|---|---|
| 5,072,412 A | 12/1991 | Henderson, Jr. et al. |
| 5,493,692 A | 2/1996 | Theimer et al. |
| 5,713,073 A | 1/1998 | Warsta |
| 5,754,939 A | 5/1998 | Herz et al. |
| 5,855,008 A | 12/1998 | Goldhaber et al. |
| 5,883,639 A | 3/1999 | Walton et al. |
| 5,999,932 A | 12/1999 | Paul |
| 6,012,098 A | 1/2000 | Bayeh et al. |
| 6,014,090 A | 1/2000 | Rosen et al. |
| 6,029,141 A | 2/2000 | Bezos et al. |
| 6,038,295 A | 3/2000 | Mattes |
| 6,049,711 A | 4/2000 | Yehezkel et al. |
| 6,154,764 A | 11/2000 | Nitta et al. |
| 6,167,435 A | 12/2000 | Druckenmiller et al. |
| 6,204,840 B1 | 3/2001 | Petelycky et al. |
| 6,205,432 B1 | 3/2001 | Gabbard et al. |
| 6,216,141 B1 | 4/2001 | Straub et al. |
| 6,285,381 B1 | 9/2001 | Sawano et al. |
| 6,285,987 B1 | 9/2001 | Roth et al. |
| 6,310,694 B1 | 10/2001 | Okimoto et al. |
| 6,317,789 B1 | 11/2001 | Rakavy et al. |
| 6,334,149 B1 | 12/2001 | Davis, Jr. et al. |
| 6,349,203 B1 | 2/2002 | Asaoka et al. |
| 6,353,170 B1 | 3/2002 | Eyzaguirre et al. |
| 6,446,004 B1 | 9/2002 | Cao et al. |
| 6,449,657 B2 | 9/2002 | Stanbach et al. |
| 6,456,852 B2 | 9/2002 | Bar et al. |
| 6,484,196 B1 | 11/2002 | Maurille |
| 6,487,601 B1 | 11/2002 | Hubacher et al. |
| 6,523,008 B1 | 2/2003 | Avrunin |
| 6,542,749 B2 | 4/2003 | Tanaka et al. |
| 6,549,768 B1 | 4/2003 | Fraccaroli |
| 6,618,593 B1 | 9/2003 | Drutman et al. |
| 6,622,174 B1 | 9/2003 | Ukita et al. |
| 6,631,463 B1 | 10/2003 | Floyd et al. |
| 6,636,247 B1 | 10/2003 | Hamzy et al. |
| 6,636,855 B2 | 10/2003 | Holloway et al. |
| 6,643,684 B1 | 11/2003 | Malkin et al. |
| 6,658,095 B1 | 12/2003 | Yoakum et al. |
| 6,665,531 B1 | 12/2003 | Soderbacka et al. |
| 6,668,173 B2 | 12/2003 | Greene |
| 6,684,238 B1 | 1/2004 | Dutta |
| 6,684,257 B1 | 1/2004 | Camut et al. |
| 6,698,020 B1 | 2/2004 | Zigmond et al. |
| 6,700,506 B1 | 3/2004 | Winkler |
| 6,720,860 B1 | 4/2004 | Narayanaswami |
| 6,724,403 B1 | 4/2004 | Santoro et al. |
| 6,757,713 B1 | 6/2004 | Ogilvie et al. |
| 6,795,858 B1 * | 9/2004 | Jain ............... H04L 67/1008 709/226 |
| 6,832,222 B1 | 12/2004 | Zimowski |
| 6,834,195 B2 | 12/2004 | Brandenberg et al. |
| 6,836,792 B1 | 12/2004 | Chen |
| 6,898,626 B2 | 5/2005 | Ohashi |
| 6,959,324 B1 | 10/2005 | Kubik et al. |
| 6,970,088 B2 | 11/2005 | Kovach |
| 6,970,907 B1 | 11/2005 | Ullmann et al. |
| 6,980,909 B2 | 12/2005 | Root et al. |
| 6,981,040 B1 | 12/2005 | Konig et al. |
| 7,020,494 B2 | 3/2006 | Spriestersbach et al. |
| 7,027,124 B2 | 4/2006 | Foote et al. |
| 7,072,963 B2 | 7/2006 | Anderson et al. |
| 7,085,571 B2 | 8/2006 | Kalhan et al. |
| 7,110,744 B2 | 9/2006 | Freeny, Jr. |
| 7,124,164 B1 | 10/2006 | Chemtob |
| 7,149,893 B1 | 12/2006 | Leonard et al. |
| 7,173,651 B1 | 2/2007 | Knowles |
| 7,188,143 B2 | 3/2007 | Szeto |
| 7,203,380 B2 | 4/2007 | Chiu et al. |
| 7,206,568 B2 | 4/2007 | Sudit |
| 7,227,937 B1 | 6/2007 | Yoakum et al. |
| 7,237,002 B1 | 6/2007 | Estrada et al. |
| 7,240,089 B2 | 7/2007 | Boudreau |
| 7,269,426 B2 | 9/2007 | Kokkonen et al. |
| 7,280,658 B2 | 10/2007 | Amini et al. |
| 7,315,823 B2 | 1/2008 | Bröndrup |
| 7,349,768 B2 | 3/2008 | Bruce et al. |
| 7,356,564 B2 | 4/2008 | Hartselle et al. |
| 7,394,345 B1 | 7/2008 | Ehlinger et al. |
| 7,411,493 B2 | 8/2008 | Smith |
| 7,423,580 B2 | 9/2008 | Markhovsky et al. |
| 7,454,442 B2 | 11/2008 | Cobleigh et al. |
| 7,508,419 B2 | 3/2009 | Toyama et al. |
| 7,512,649 B2 | 3/2009 | Faybishenko et al. |
| 7,519,670 B2 | 4/2009 | Hagale et al. |
| 7,535,890 B2 | 5/2009 | Rojas |
| 7,546,554 B2 | 6/2009 | Chiu et al. |
| 7,607,096 B2 | 10/2009 | Oreizy et al. |
| 7,639,943 B1 | 12/2009 | Kalajan |
| 7,650,231 B2 | 1/2010 | Gadler |
| 7,668,537 B2 | 2/2010 | DeVries |
| 7,770,137 B2 | 8/2010 | Forbes et al. |
| 7,778,973 B2 | 8/2010 | Choi |
| 7,779,444 B2 | 8/2010 | Glad |
| 7,787,886 B2 | 8/2010 | Markhovsky et al. |
| 7,796,946 B2 | 9/2010 | Eisenbach |
| 7,801,954 B2 | 9/2010 | Cadiz et al. |
| 7,856,360 B2 | 12/2010 | Kramer et al. |
| 8,001,204 B2 | 8/2011 | Burtner et al. |
| 8,032,586 B2 | 10/2011 | Challenger et al. |
| 8,082,255 B1 | 12/2011 | Carlson, Jr. et al. |
| 8,090,351 B2 | 1/2012 | Klein |
| 8,098,904 B2 | 1/2012 | Ioffe et al. |
| 8,099,109 B2 | 1/2012 | Altman et al. |
| 8,112,716 B2 | 2/2012 | Kobayashi |
| 8,131,597 B2 | 3/2012 | Hudetz |
| 8,135,166 B2 | 3/2012 | Rhoads |
| 8,136,028 B1 | 3/2012 | Loeb et al. |
| 8,146,001 B1 | 3/2012 | Reese |
| 8,161,115 B2 | 4/2012 | Yamamoto |
| 8,161,417 B1 | 4/2012 | Lee |
| 8,195,203 B1 | 6/2012 | Tseng |
| 8,199,747 B2 | 6/2012 | Rojas et al. |
| 8,208,943 B2 | 6/2012 | Petersen |
| 8,214,443 B2 | 7/2012 | Hamburg |
| 8,234,350 B1 | 7/2012 | Gu et al. |
| 8,276,092 B1 | 9/2012 | Narayanan et al. |
| 8,279,319 B2 | 10/2012 | Date |
| 8,280,406 B2 | 10/2012 | Ziskind et al. |
| 8,285,199 B2 | 10/2012 | Hsu et al. |
| 8,287,380 B2 | 10/2012 | Nguyen et al. |
| 8,301,159 B2 | 10/2012 | Hamynen et al. |
| 8,306,922 B1 | 11/2012 | Kunal et al. |
| 8,312,086 B2 | 11/2012 | Velusamy et al. |
| 8,312,097 B1 | 11/2012 | Siegel et al. |
| 8,326,315 B2 | 12/2012 | Phillips et al. |
| 8,326,327 B2 | 12/2012 | Hymel et al. |
| 8,332,475 B2 | 12/2012 | Rosen et al. |
| 8,352,546 B1 | 1/2013 | Dollard |
| 8,379,130 B2 | 2/2013 | Forutanpour et al. |
| 8,385,950 B1 | 2/2013 | Wagner et al. |
| 8,402,097 B2 | 3/2013 | Szeto |
| 8,405,773 B2 | 3/2013 | Hayashi et al. |
| 8,418,067 B2 | 4/2013 | Cheng et al. |
| 8,423,409 B2 | 4/2013 | Rao |
| 8,471,914 B2 | 6/2013 | Sakiyama et al. |
| 8,472,935 B1 | 6/2013 | Fujisaki |
| 8,510,383 B2 | 8/2013 | Hurley et al. |
| 8,527,345 B2 | 9/2013 | Rothschild et al. |
| 8,554,627 B2 | 10/2013 | Svendsen et al. |
| 8,560,612 B2 | 10/2013 | Kilmer et al. |
| 8,594,680 B2 | 11/2013 | Ledlie et al. |
| 8,606,787 B1 * | 12/2013 | Asgekar ............ G06F 17/30598 707/737 |
| 8,613,089 B1 | 12/2013 | Holloway et al. |
| 8,660,358 B1 | 2/2014 | Bergboer et al. |
| 8,660,369 B2 | 2/2014 | Llano et al. |
| 8,660,793 B2 | 2/2014 | Ngo et al. |
| 8,682,350 B2 | 3/2014 | Altman et al. |
| 8,718,333 B2 | 5/2014 | Wolf et al. |
| 8,724,622 B2 | 5/2014 | Rojas |
| 8,732,168 B2 | 5/2014 | Johnson |
| 8,744,523 B2 | 6/2014 | Fan et al. |
| 8,745,132 B2 | 6/2014 | Obradovich |

(56) References Cited

U.S. PATENT DOCUMENTS

| | | |
|---|---|---|
| 8,761,800 B2 | 6/2014 | Kuwahara |
| 8,768,876 B2 | 7/2014 | Shim et al. |
| 8,775,972 B2 | 7/2014 | Spiegel |
| 8,788,680 B1 | 7/2014 | Naik |
| 8,790,187 B2 | 7/2014 | Walker et al. |
| 8,797,415 B2 | 8/2014 | Arnold |
| 8,798,646 B1 | 8/2014 | Wang et al. |
| 8,856,349 B2 | 10/2014 | Jain et al. |
| 8,874,677 B2 | 10/2014 | Rosen et al. |
| 8,886,227 B2 | 11/2014 | Schmidt et al. |
| 8,892,651 B1 * | 11/2014 | Goldman et al. ............ 709/204 |
| 8,909,679 B2 | 12/2014 | Roote et al. |
| 8,909,725 B1 | 12/2014 | Sehn |
| 8,972,357 B2 | 3/2015 | Shim et al. |
| 8,995,433 B2 | 3/2015 | Rojas |
| 9,015,285 B1 | 4/2015 | Ebsen et al. |
| 9,020,745 B2 | 4/2015 | Johnston et al. |
| 9,040,574 B2 | 5/2015 | Wang et al. |
| 9,055,416 B2 | 6/2015 | Rosen et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,119,027 B2 | 8/2015 | Sharon et al. |
| 9,123,074 B2 | 9/2015 | Jacobs |
| 9,143,382 B2 | 9/2015 | Bhogal et al. |
| 9,143,681 B2 | 9/2015 | Ebsen et al. |
| 9,152,477 B1 | 10/2015 | Campbell et al. |
| 9,191,776 B2 | 11/2015 | Root et al. |
| 9,204,252 B2 | 12/2015 | Root |
| 9,225,897 B1 | 12/2015 | Sehn et al. |
| 9,258,459 B2 | 2/2016 | Hartley |
| 9,344,606 B2 | 5/2016 | Hartley et al. |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,430,783 B1 | 8/2016 | Sehn |
| 9,439,041 B2 | 9/2016 | Parvizi et al. |
| 9,443,227 B2 | 9/2016 | Evans et al. |
| 9,450,907 B2 | 9/2016 | Pridmore et al. |
| 9,459,778 B2 | 10/2016 | Hogeg et al. |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Allen et al. |
| 9,628,950 B1 | 4/2017 | Noeth et al. |
| 9,710,821 B2 | 7/2017 | Heath |
| 9,854,219 B2 | 12/2017 | Sehn |
| 2002/0047868 A1 | 4/2002 | Miyazawa |
| 2002/0069279 A1 * | 6/2002 | Romero ................ H04L 45/302 |
| | | 709/225 |
| 2002/0078456 A1 | 6/2002 | Hudson et al. |
| 2002/0087631 A1 | 7/2002 | Sharma |
| 2002/0097257 A1 | 7/2002 | Miller et al. |
| 2002/0122659 A1 | 9/2002 | Mcgrath et al. |
| 2002/0128047 A1 | 9/2002 | Gates |
| 2002/0144154 A1 | 10/2002 | Tomkow |
| 2003/0001846 A1 | 1/2003 | Davis et al. |
| 2003/0016247 A1 | 1/2003 | Lai et al. |
| 2003/0017823 A1 | 1/2003 | Mager et al. |
| 2003/0020623 A1 | 1/2003 | Cao et al. |
| 2003/0023874 A1 | 1/2003 | Prokupets et al. |
| 2003/0037124 A1 | 2/2003 | Yamaura et al. |
| 2003/0052925 A1 | 3/2003 | Daimon et al. |
| 2003/0101230 A1 | 5/2003 | Benschoter et al. |
| 2003/0110503 A1 | 6/2003 | Perkes |
| 2003/0126215 A1 | 7/2003 | Udell |
| 2003/0148773 A1 | 8/2003 | Spriestersbach et al. |
| 2003/0164856 A1 | 9/2003 | Prager et al. |
| 2003/0229607 A1 | 12/2003 | Zellweger et al. |
| 2004/0027371 A1 | 2/2004 | Jaeger |
| 2004/0064429 A1 | 4/2004 | Hirstius et al. |
| 2004/0078367 A1 | 4/2004 | Anderson et al. |
| 2004/0083307 A1 * | 4/2004 | Uysal ................. H04L 67/16 |
| | | 709/246 |
| 2004/0111467 A1 | 6/2004 | Willis |
| 2004/0133626 A1 * | 7/2004 | Herrero ................. H04L 29/06 |
| | | 709/200 |
| 2004/0158739 A1 | 8/2004 | Wakai et al. |
| 2004/0189465 A1 | 9/2004 | Capobianco et al. |
| 2004/0203959 A1 | 10/2004 | Coombes |
| 2004/0215625 A1 | 10/2004 | Svendsen et al. |
| 2004/0243531 A1 | 12/2004 | Dean |
| 2004/0243688 A1 | 12/2004 | Wugofski |
| 2005/0021444 A1 | 1/2005 | Bauer et al. |
| 2005/0022211 A1 | 1/2005 | Veselov et al. |
| 2005/0048989 A1 | 3/2005 | Jung |
| 2005/0078804 A1 | 4/2005 | Yomoda |
| 2005/0097176 A1 | 5/2005 | Schatz et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0119936 A1 | 6/2005 | Buchanan et al. |
| 2005/0122405 A1 | 6/2005 | Voss et al. |
| 2005/0193340 A1 | 9/2005 | Amburgey et al. |
| 2005/0193345 A1 | 9/2005 | Klassen et al. |
| 2005/0198128 A1 | 9/2005 | Anderson |
| 2005/0223066 A1 | 10/2005 | Buchheit et al. |
| 2005/0246441 A1 * | 11/2005 | Chandrasekaran ........................ |
| | | H04L 67/1008 |
| | | 709/226 |
| 2005/0288954 A1 | 12/2005 | McCarthy et al. |
| 2006/0026067 A1 | 2/2006 | Nicholas et al. |
| 2006/0041939 A1 * | 2/2006 | Schwartzman ..... H04L 63/0884 |
| | | 726/15 |
| 2006/0107297 A1 | 5/2006 | Toyama et al. |
| 2006/0114338 A1 | 6/2006 | Rothschild |
| 2006/0119882 A1 | 6/2006 | Harris et al. |
| 2006/0242239 A1 | 10/2006 | Morishima et al. |
| 2006/0252438 A1 | 11/2006 | Ansamaa et al. |
| 2006/0265417 A1 | 11/2006 | Amato et al. |
| 2006/0270419 A1 | 11/2006 | Crowley et al. |
| 2006/0287878 A1 | 12/2006 | Wadhwa et al. |
| 2007/0004426 A1 | 1/2007 | Pfleging et al. |
| 2007/0038715 A1 | 2/2007 | Collins et al. |
| 2007/0040931 A1 | 2/2007 | Nishizawa |
| 2007/0073517 A1 | 3/2007 | Panje |
| 2007/0073823 A1 | 3/2007 | Cohen et al. |
| 2007/0075898 A1 | 4/2007 | Markhovsky et al. |
| 2007/0082707 A1 | 4/2007 | Flynt et al. |
| 2007/0136228 A1 | 6/2007 | Petersen |
| 2007/0192128 A1 | 8/2007 | Celestini |
| 2007/0198340 A1 | 8/2007 | Lucovsky et al. |
| 2007/0198495 A1 | 8/2007 | Buron et al. |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0214216 A1 | 9/2007 | Carrer et al. |
| 2007/0233556 A1 | 10/2007 | Koningstein |
| 2007/0233801 A1 | 10/2007 | Eren et al. |
| 2007/0233859 A1 | 10/2007 | Zhao et al. |
| 2007/0243887 A1 | 10/2007 | Bandhole et al. |
| 2007/0244750 A1 | 10/2007 | Grannan et al. |
| 2007/0255456 A1 | 11/2007 | Funayama |
| 2007/0281690 A1 | 12/2007 | Altman et al. |
| 2008/0022329 A1 | 1/2008 | Glad |
| 2008/0025701 A1 | 1/2008 | Ikeda |
| 2008/0032703 A1 | 2/2008 | Krumm et al. |
| 2008/0033930 A1 | 2/2008 | Warren |
| 2008/0043041 A2 | 2/2008 | Hedenstroem et al. |
| 2008/0049704 A1 | 2/2008 | Witteman et al. |
| 2008/0055395 A1 * | 3/2008 | Mock ................. G06Q 20/3224 |
| | | 348/14.01 |
| 2008/0062141 A1 | 3/2008 | Chandhri |
| 2008/0076505 A1 | 3/2008 | Ngyen et al. |
| 2008/0092233 A1 | 4/2008 | Tian et al. |
| 2008/0094387 A1 | 4/2008 | Chen |
| 2008/0104503 A1 | 5/2008 | Beall et al. |
| 2008/0109844 A1 | 5/2008 | Baldeschweiler et al. |
| 2008/0120409 A1 | 5/2008 | Sun et al. |
| 2008/0126529 A1 * | 5/2008 | Kim ................. H04W 4/02 |
| | | 709/223 |

(56) References Cited

U.S. PATENT DOCUMENTS

| | | |
|---|---|---|
| 2008/0140650 A1* | 6/2008 | Stackpole ............... 709/204 |
| 2008/0141281 A1* | 6/2008 | Ramsey ............... G06Q 40/00 719/318 |
| 2008/0147730 A1 | 6/2008 | Lee et al. |
| 2008/0148150 A1 | 6/2008 | Mall |
| 2008/0158230 A1 | 7/2008 | Sharma et al. |
| 2008/0168033 A1 | 7/2008 | Ott et al. |
| 2008/0168489 A1 | 7/2008 | Schraga |
| 2008/0189177 A1 | 8/2008 | Anderton et al. |
| 2008/0207176 A1 | 8/2008 | Brackbill et al. |
| 2008/0208692 A1 | 8/2008 | Garaventi et al. |
| 2008/0214210 A1 | 9/2008 | Rasanen et al. |
| 2008/0222545 A1 | 9/2008 | Lemay et al. |
| 2008/0255976 A1 | 10/2008 | Altberg et al. |
| 2008/0256446 A1 | 10/2008 | Yamamoto |
| 2008/0256577 A1 | 10/2008 | Funaki et al. |
| 2008/0266421 A1 | 10/2008 | Takahata et al. |
| 2008/0270938 A1 | 10/2008 | Carlson |
| 2008/0288338 A1 | 11/2008 | Wiseman et al. |
| 2008/0306826 A1 | 12/2008 | Kramer et al. |
| 2008/0313329 A1 | 12/2008 | Wang et al. |
| 2008/0313346 A1 | 12/2008 | Kujawa et al. |
| 2008/0318616 A1 | 12/2008 | Chipalkatti et al. |
| 2009/0006191 A1 | 1/2009 | Arankalle et al. |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0030774 A1 | 1/2009 | Rothschild et al. |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0089678 A1 | 4/2009 | Sacco et al. |
| 2009/0089710 A1 | 4/2009 | Wood et al. |
| 2009/0093261 A1 | 4/2009 | Ziskind |
| 2009/0132341 A1 | 5/2009 | Klinger |
| 2009/0132453 A1 | 5/2009 | Hangartner et al. |
| 2009/0132665 A1 | 5/2009 | Thomsen et al. |
| 2009/0148045 A1 | 6/2009 | Lee et al. |
| 2009/0153492 A1 | 6/2009 | Popp |
| 2009/0157450 A1 | 6/2009 | Athsani et al. |
| 2009/0157752 A1 | 6/2009 | Gonzalez |
| 2009/0160970 A1 | 6/2009 | Fredlund et al. |
| 2009/0163182 A1 | 6/2009 | Gatti et al. |
| 2009/0177299 A1 | 7/2009 | Van De Sluis |
| 2009/0192900 A1 | 7/2009 | Collision |
| 2009/0199242 A1 | 8/2009 | Johnson et al. |
| 2009/0215469 A1 | 8/2009 | Fisher et al. |
| 2009/0232354 A1 | 9/2009 | Camp, Jr. et al. |
| 2009/0234815 A1 | 9/2009 | Boerries et al. |
| 2009/0239552 A1 | 9/2009 | Churchill et al. |
| 2009/0249222 A1 | 10/2009 | Schmidt et al. |
| 2009/0249244 A1 | 10/2009 | Robinson et al. |
| 2009/0265647 A1 | 10/2009 | Martin et al. |
| 2009/0288022 A1 | 11/2009 | Almstrand et al. |
| 2009/0291672 A1 | 11/2009 | Treves et al. |
| 2009/0292608 A1 | 11/2009 | Polachek |
| 2009/0319607 A1 | 12/2009 | Belz et al. |
| 2009/0327073 A1 | 12/2009 | Li |
| 2010/0062794 A1 | 3/2010 | Han |
| 2010/0076968 A1* | 3/2010 | Boyns ............... G06F 17/30241 707/732 |
| 2010/0082427 A1 | 4/2010 | Burgener et al. |
| 2010/0082693 A1 | 4/2010 | Hugg et al. |
| 2010/0100568 A1 | 4/2010 | Papin et al. |
| 2010/0113065 A1 | 5/2010 | Narayan et al. |
| 2010/0130233 A1 | 5/2010 | Parker |
| 2010/0131880 A1 | 5/2010 | Lee et al. |
| 2010/0131895 A1 | 5/2010 | Wohlert |
| 2010/0153144 A1 | 6/2010 | Miller et al. |
| 2010/0159944 A1 | 6/2010 | Pascal et al. |
| 2010/0161658 A1 | 6/2010 | Hamynen et al. |
| 2010/0161831 A1 | 6/2010 | Haas et al. |
| 2010/0162149 A1 | 6/2010 | Sheleheda et al. |
| 2010/0183280 A1 | 7/2010 | Beauregard et al. |
| 2010/0185552 A1 | 7/2010 | Deluca et al. |
| 2010/0185665 A1 | 7/2010 | Horn et al. |
| 2010/0191631 A1 | 7/2010 | Weidmann |
| 2010/0197318 A1 | 8/2010 | Peterson et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |
| 2010/0198826 A1 | 8/2010 | Petersen |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0250109 A1 | 9/2010 | Johnston et al. |
| 2010/0257196 A1 | 10/2010 | Waters et al. |
| 2010/0259386 A1 | 10/2010 | Holley et al. |
| 2010/0273509 A1 | 10/2010 | Sweeney et al. |
| 2010/0281045 A1 | 11/2010 | Dean |
| 2010/0306669 A1 | 12/2010 | Della Pasqua |
| 2010/0312809 A1* | 12/2010 | Calder et al. ............... 707/912 |
| 2011/0004071 A1 | 1/2011 | Faiola et al. |
| 2011/0010205 A1 | 1/2011 | Richards |
| 2011/0016399 A1* | 1/2011 | Yasrebi ............... H04L 12/588 715/734 |
| 2011/0029512 A1 | 2/2011 | Folgner et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066743 A1 | 3/2011 | Hurley et al. |
| 2011/0083101 A1 | 4/2011 | Sharon et al. |
| 2011/0102630 A1 | 5/2011 | Rukes |
| 2011/0119133 A1 | 5/2011 | Igelman et al. |
| 2011/0137881 A1 | 6/2011 | Cheng et al. |
| 2011/0145564 A1 | 6/2011 | Moshir et al. |
| 2011/0159890 A1 | 6/2011 | Fortescue et al. |
| 2011/0164163 A1 | 7/2011 | Bilbrey et al. |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0207440 A1* | 8/2011 | Ruuspakka ............... H04W 4/08 455/414.1 |
| 2011/0208814 A1* | 8/2011 | Bostrom et al. ............... 709/204 |
| 2011/0211534 A1 | 9/2011 | Schmidt et al. |
| 2011/0212783 A1* | 9/2011 | Dale ............... H04L 67/1002 463/42 |
| 2011/0213845 A1 | 9/2011 | Logan et al. |
| 2011/0215966 A1 | 9/2011 | Kim et al. |
| 2011/0225048 A1 | 9/2011 | Nair |
| 2011/0238763 A1 | 9/2011 | Shin et al. |
| 2011/0255736 A1 | 10/2011 | Thompson et al. |
| 2011/0265011 A1* | 10/2011 | Taylor et al. ............... 715/751 |
| 2011/0273575 A1 | 11/2011 | Lee |
| 2011/0282799 A1 | 11/2011 | Huston |
| 2011/0283188 A1 | 11/2011 | Farrenkopf |
| 2011/0314419 A1 | 12/2011 | Dunn et al. |
| 2011/0320373 A1 | 12/2011 | Lee et al. |
| 2012/0150978 A1 | 1/2012 | Monaco |
| 2012/0028659 A1 | 2/2012 | Whitney et al. |
| 2012/0033718 A1 | 2/2012 | Kauffman et al. |
| 2012/0036015 A1 | 2/2012 | Sheikh |
| 2012/0036443 A1 | 2/2012 | Ohmori et al. |
| 2012/0054797 A1 | 3/2012 | Skog et al. |
| 2012/0059722 A1 | 3/2012 | Rao |
| 2012/0062805 A1 | 3/2012 | Candelore |
| 2012/0071244 A1* | 3/2012 | Gillo ............... A63F 13/00 463/42 |
| 2012/0084731 A1 | 4/2012 | Filman et al. |
| 2012/0084835 A1 | 4/2012 | Thomas et al. |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0113143 A1 | 5/2012 | Adhikari et al. |

(56) References Cited

U.S. PATENT DOCUMENTS

| | | |
|---|---|---|
| 2012/0113272 A1 | 5/2012 | Hata |
| 2012/0123830 A1 | 5/2012 | Svendsen et al. |
| 2012/0123871 A1 | 5/2012 | Svendsen et al. |
| 2012/0123875 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0131507 A1 | 5/2012 | Sparandara et al. |
| 2012/0131512 A1 | 5/2012 | Takeuchi et al. |
| 2012/0143760 A1 | 6/2012 | Abulafia et al. |
| 2012/0165100 A1 | 6/2012 | Lalancette et al. |
| 2012/0166971 A1 | 6/2012 | Sachson et al. |
| 2012/0169855 A1 | 7/2012 | Oh |
| 2012/0172062 A1 | 7/2012 | Altman et al. |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0197724 A1 | 8/2012 | Kendall |
| 2012/0200743 A1 | 8/2012 | Blanchflower et al. |
| 2012/0209924 A1 | 8/2012 | Evans et al. |
| 2012/0210244 A1 | 8/2012 | De Francisco et al. |
| 2012/0212632 A1 | 8/2012 | Mate et al. |
| 2012/0220264 A1 | 8/2012 | Kawabata |
| 2012/0226748 A1 | 9/2012 | Bosworth et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0252418 A1 | 10/2012 | Kandekar et al. |
| 2012/0254325 A1 | 10/2012 | Majeti et al. |
| 2012/0266081 A1* | 10/2012 | Kao ............................ 715/751 |
| 2012/0278387 A1 | 11/2012 | Garcia et al. |
| 2012/0278692 A1 | 11/2012 | Shi |
| 2012/0284296 A1* | 11/2012 | Arifuddin ............ H04L 67/1027 707/769 |
| 2012/0290637 A1 | 11/2012 | Perantatos et al. |
| 2012/0290643 A1* | 11/2012 | Fok Ah Chuen ....... H04W 4/02 709/203 |
| 2012/0299954 A1 | 11/2012 | Wada et al. |
| 2012/0304052 A1 | 11/2012 | Tanaka et al. |
| 2012/0304080 A1 | 11/2012 | Wormald et al. |
| 2012/0307096 A1 | 12/2012 | Bray et al. |
| 2012/0307112 A1 | 12/2012 | Kunishige et al. |
| 2012/0319904 A1 | 12/2012 | Lee et al. |
| 2012/0323933 A1 | 12/2012 | He et al. |
| 2012/0324018 A1 | 12/2012 | Metcalf et al. |
| 2012/0324027 A1* | 12/2012 | Vaynblat et al. ............. 709/206 |
| 2013/0006759 A1 | 1/2013 | Srivastava et al. |
| 2013/0024757 A1 | 1/2013 | Doll et al. |
| 2013/0036364 A1 | 2/2013 | Johnson |
| 2013/0041916 A1* | 2/2013 | Biesecker et al. ............ 707/769 |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0080254 A1 | 3/2013 | Thramann |
| 2013/0085790 A1 | 4/2013 | Palmer et al. |
| 2013/0086072 A1 | 4/2013 | Peng et al. |
| 2013/0090171 A1 | 4/2013 | Holton et al. |
| 2013/0095857 A1 | 4/2013 | Garcia et al. |
| 2013/0097237 A1* | 4/2013 | Kothari et al. ............... 709/204 |
| 2013/0104053 A1 | 4/2013 | Thornton et al. |
| 2013/0107752 A1* | 5/2013 | Kadakia ............ H04L 65/1073 370/254 |
| 2013/0110885 A1 | 5/2013 | Brundrett, III |
| 2013/0111514 A1 | 5/2013 | Slavin et al. |
| 2013/0128059 A1 | 5/2013 | Kristensson |
| 2013/0129252 A1 | 5/2013 | Lauper |
| 2013/0132477 A1 | 5/2013 | Bosworth et al. |
| 2013/0145286 A1 | 6/2013 | Feng et al. |
| 2013/0159110 A1 | 6/2013 | Rajaram et al. |
| 2013/0159919 A1 | 6/2013 | Leydon |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0191198 A1 | 7/2013 | Carlson et al. |
| 2013/0194301 A1 | 8/2013 | Robbins et al. |
| 2013/0198176 A1 | 8/2013 | Kim |
| 2013/0218965 A1 | 8/2013 | Abrol et al. |
| 2013/0218968 A1 | 8/2013 | Mcevilly et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0290443 A1 | 10/2013 | Collins et al. |
| 2013/0304646 A1 | 11/2013 | De Geer |
| 2013/0311255 A1 | 11/2013 | Cummins et al. |
| 2013/0325964 A1 | 12/2013 | Berberat |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0006129 A1 | 1/2014 | Heath |
| 2014/0011538 A1 | 1/2014 | Mulcahy et al. |
| 2014/0019264 A1 | 1/2014 | Wachman et al. |
| 2014/0032682 A1 | 1/2014 | Prado et al. |
| 2014/0043204 A1 | 2/2014 | Basnayake et al. |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0082651 A1 | 3/2014 | Sharifi |
| 2014/0092130 A1 | 4/2014 | Anderson et al. |
| 2014/0095516 A1* | 4/2014 | Purdy ................ G06Q 30/0204 707/749 |
| 2014/0096029 A1 | 4/2014 | Schultz |
| 2014/0106763 A1* | 4/2014 | Boldyrev ............ H04W 72/048 455/452.1 |
| 2014/0113674 A1* | 4/2014 | Joseph ................ H04W 4/021 455/519 |
| 2014/0114565 A1 | 4/2014 | Aziz et al. |
| 2014/0122658 A1 | 5/2014 | Haeger et al. |
| 2014/0122787 A1 | 5/2014 | Shalvi et al. |
| 2014/0129953 A1 | 5/2014 | Spiegel |
| 2014/0143143 A1 | 5/2014 | Fasoli et al. |
| 2014/0143407 A1* | 5/2014 | Zhang ................ H04L 41/145 709/224 |
| 2014/0149519 A1 | 5/2014 | Redfern et al. |
| 2014/0155102 A1 | 6/2014 | Cooper et al. |
| 2014/0173424 A1 | 6/2014 | Hogeg et al. |
| 2014/0173457 A1 | 6/2014 | Wang et al. |
| 2014/0189592 A1 | 7/2014 | Benchenaa et al. |
| 2014/0207679 A1 | 7/2014 | Cho |
| 2014/0214471 A1 | 7/2014 | Schreiner, III |
| 2014/0222564 A1 | 8/2014 | Kranendonk et al. |
| 2014/0258405 A1 | 9/2014 | Perkin |
| 2014/0265359 A1 | 9/2014 | Cheng et al. |
| 2014/0266703 A1 | 9/2014 | Dalley, Jr. et al. |
| 2014/0279061 A1 | 9/2014 | Elimeliah et al. |
| 2014/0279436 A1 | 9/2014 | Dorsey et al. |
| 2014/0279540 A1 | 9/2014 | Jackson |
| 2014/0280537 A1 | 9/2014 | Pridmore et al. |
| 2014/0282096 A1 | 9/2014 | Rubinstein et al. |
| 2014/0287779 A1 | 9/2014 | O'keefe et al. |
| 2014/0289833 A1 | 9/2014 | Briceno |
| 2014/0306986 A1 | 10/2014 | Gottesman et al. |
| 2014/0317302 A1 | 10/2014 | Naik |
| 2014/0324627 A1 | 10/2014 | Haver et al. |
| 2014/0324629 A1 | 10/2014 | Jacobs |
| 2014/0325383 A1 | 10/2014 | Brown et al. |
| 2015/0020086 A1 | 1/2015 | Chen et al. |
| 2015/0046278 A1 | 2/2015 | Pei et al. |

(56) References Cited

U.S. PATENT DOCUMENTS

| | | |
|---|---|---|
| 2015/0071619 A1 | 3/2015 | Brough |
| 2015/0087263 A1 | 3/2015 | Branscomb |
| 2015/0088622 A1 | 3/2015 | Ganschow et al. |
| 2015/0095020 A1 | 4/2015 | Leydon |
| 2015/0096042 A1 | 4/2015 | Mizrachi |
| 2015/0116529 A1 | 4/2015 | Wu et al. |
| 2015/0169827 A1 | 6/2015 | Laborde |
| 2015/0172534 A1 | 6/2015 | Miyakawaa et al. |
| 2015/0178260 A1 | 6/2015 | Brunson |
| 2015/0222814 A1 | 8/2015 | Li et al. |
| 2015/0261917 A1 | 9/2015 | Smith |
| 2015/0312184 A1 | 10/2015 | Langholz et al. |
| 2015/0339638 A1* | 11/2015 | DeLuca ............ G06Q 20/3224 705/39 |
| 2015/0350136 A1 | 12/2015 | Flynn, III et al. |
| 2015/0365795 A1 | 12/2015 | Allen et al. |
| 2015/0378502 A1 | 12/2015 | Hu et al. |
| 2016/0006927 A1 | 1/2016 | Sehn |
| 2016/0014063 A1 | 1/2016 | Hogeg et al. |
| 2016/0085773 A1 | 3/2016 | Chang et al. |
| 2016/0085863 A1 | 3/2016 | Allen et al. |
| 2016/0099901 A1 | 4/2016 | Allen et al. |
| 2016/0180887 A1 | 6/2016 | Sehn |
| 2016/0182422 A1 | 6/2016 | Sehn et al. |
| 2016/0182875 A1 | 6/2016 | Sehn |
| 2016/0239248 A1 | 8/2016 | Sehn |
| 2016/0277419 A1 | 9/2016 | Allen et al. |
| 2016/0321708 A1 | 11/2016 | Sehn |
| 2017/0006094 A1 | 1/2017 | Abou Mahmoud et al. |
| 2017/0061308 A1 | 3/2017 | Chen et al. |
| 2017/0287006 A1 | 10/2017 | Azmoodeh et al. |

FOREIGN PATENT DOCUMENTS

| | | | |
|---|---|---|---|
| EP | 2151797 A1 | 2/2010 | |
| GB | 2399928 A | 9/2004 | |
| KR | 19990073076 A | 10/1999 | |
| KR | 20010078417 A | 8/2001 | |
| WO | WO-1996024213 A1 | 8/1996 | |
| WO | WO-1999063453 A1 | 12/1999 | |
| WO | WO-2000058882 A1 | 10/2000 | |
| WO | WO-2001029642 A1 | 4/2001 | |
| WO | WO-2001050703 A3 | 7/2001 | |
| WO | WO-2006118755 A2 | 11/2006 | |
| WO | 2007092668 | 8/2007 | |
| WO | WO-2009043020 A2 | 4/2009 | |
| WO | WO 2010148326 A1 * | 12/2010 | ....... G06F 17/30551 |
| WO | WO-2011040821 A1 | 4/2011 | |
| WO | WO-2011119407 A1 | 9/2011 | |
| WO | WO 2012166213 A1 * | 12/2012 | ........... G06Q 10/101 |
| WO | 2013008238 A1 | 1/2013 | |
| WO | WO-2013008238 | 1/2013 | |
| WO | WO-2013045753 A1 | 4/2013 | |
| WO | 2014006129 A1 | 1/2014 | |
| WO | WO-2014068573 A1 | 5/2014 | |
| WO | WO-2014115136 A1 | 7/2014 | |
| WO | WO-2014194262 A2 | 12/2014 | |
| WO | WO-2015192026 A1 | 12/2015 | |
| WO | WO-2016044424 A1 | 3/2016 | |
| WO | WO-2016054562 A1 | 4/2016 | |
| WO | WO-2016065131 A1 | 4/2016 | |
| WO | WO-2016100318 A2 | 6/2016 | |
| WO | WO-2016100318 A3 | 6/2016 | |
| WO | WO-2016100342 A1 | 6/2016 | |
| WO | WO-2016149594 A1 | 9/2016 | |
| WO | WO-2016179166 A1 | 11/2016 | |

OTHER PUBLICATIONS

"A Whole New Story", [Online]. Retrieved from the Internet: <https://www.snap.com/en-US/news/>, (2017), 13 pgs.

"Adding a watermark to your photos", eBay, [Online]. Retrieved from the Internet:<URL:http://pages.ebay.com/help/sell/pictures.html>, (accessed May 24, 2017), 4 pgs.

"BlogStomp", [Online]. Retrieved from the Internet: <URL:http://stompsoftware.com/blogstomp>, (accessed May 24, 2017), 12 pgs.

"Cup Magic Starbucks Holiday Red Cups come to life with AR app", [Online]. Retrieved from the Internet: <http://www.blastradius.com/work/cup-magic>, (2016), 7 pgs.

"Daily App: InstaPlace (iOS/Android): Give Pictures a Sense of Place", TechPP, [Online]. Retrieved from the Internet: <URL;http://techpp.com/2013/02/15/instaplace-app-review>, (2013), 13 pgs.

"InstaPlace Photo App Tell the Whole Story", [Online]. Retrieved from the Internet; <https://youtu.be/uF_gFkg1hBM>, (Nov. 8, 2013), 113 pgs.

"International Application Serical No. PCT/US 2015/037251, International Search Report dated Sep. 29, 2015", 7 pgs.

"Introducing Snapchat Stories", [Online]. Retrieved from the Internet:<https://www.youtube.com/watch?v=88Cu3yN-LIM>, (Oct. 3, 2013), 92 pgs.

"Macy's Believe-o-Magic", {Online}. Retrieved from the Internet: <https://www.youtube.com/watch?v=xvzRXy3J0Z0>, (Nov. 7, 2011), 102 pgs.

"Macy's Introduces Augmented Reality Experience in Stores across Country as Part of Its 2011 "Believe" Campaign", [Online]. Retrieved from the Internet: <http://www.businesswire.com/news/home/20111102006759/en/Macy%E2%80%99s-Introduces-Augmented-Reality-Experience-Stores-Country>., (Nov. 2, 2011), 6 pgs.

"Starbucks Cup Magic", {Online}. Retrieved from the Internet: <https://www.youtube.com/watch?v=RWwQXi9RG0w>, (Nov. 8, 2011), 87 pgs.

"Starbucks Cup Magic for Valentine's Day", {Online}. Retrieved from the Internet: <https://www.youtube.com/watch?v=8nvqOzjq10w>, (Feb. 6, 2012), 88 pgs.

"Starbucks Holiday Red Cups Come to Life, Signaling the Return of the Merriest Season", [Online]. Retrieved from the Internet: <http://www.businesswire.com/news/home/20111115005744/en/2479513/Starbucks-Holiday-Red-Cups-Life-Signaling-Return>, (Nov. 15, 2011), 5 pgs.

Carthy, Roi, "Dear All Photo Apps: Mobli Just Won Filters", [Online]. Retrieved from the Internet: URL<https://techcrunch.com/2011/09/08/mobli-filters>, (Sep. 8, 2011), 10 pgs.

Janthong, Isaranu, "Android App Review Thailand", [Online]. Retrieved from the Internet:<http://www.android-free-app-review.com/2013/01/instaplace-android-google-play-store.html>, (Jan. 23, 2013), 9 pgs.

Macleod, Duncan, "Macys Believe-o-Magic App", [Online]. Retrieved from the Internet: <URL:http://theinspirationroom.com/daily/2011/macys-believe-o-magic-app>, (Nov. 14, 2011), 10 pgs.

Macleod, Duncan, "Starbucks Cup Magic—Let's Merry", {Online}. Retrieved from the Internet: <URL; http://theinspirationroom.com/daily/2011/starbucks-cup-magic>, (Nov. 12, 2011), 8 pgs.

Notopoulos, Katie, "A Guide to the New Snapchat Filters and Big Fonts", [Online]. Retrieved from the Internet:<https://www.buzzfeed.com/katienotopoulos/a-guide-to-the-new-snapchat-filters-and-big-fonts?utm_term=.bkQ9qVZWe#.nv58YXpkV>, (Dec. 22, 2013), 13 pgs.

Panzarino, Matthew, "Snapchat Adds Filters, a Replay Function and for Whatever Reason, Time, Temperature and Speed Overlays", [Online]. Retrieved from the Internet: <https://techcrunch.com/2013/12/20/snapchat-adds-filters-new-font-and-for-some-reason-time-temperature-and-speed-overlays/>, (Dec. 20, 2013), 12 pgs.

Tripathi, Rohit, "Watermark Images in PHP and Save File on Server", [Online]. Retrieved from the Internet: <URL:http://code.rohitink.com/2012/12/28/watermark-images-in-php-and-save-file-on-server/>, (Dec. 28, 2012), 4 pgs.

* cited by examiner

SOCIAL GRAPH BASED CO-LOCATION OF NETWORK USERS

TECHNICAL FIELD

The subject matter disclosed herein generally relates to provisioning network server resources for generating and distributing electronic messages. More specifically, the present disclosure describes systems and methods for grouping network users based on social graph data (e.g., a social graph is a graph that depicts the relations of network users) and profiling the groups in order to efficiently match the groups to the available network server resources.

BACKGROUND

Workload forecasting and capacity planning are fundamental in provisioning of web services and applications. It is common for workload parameters to be analyzed "after the fact", for example, to compensate for workload levels already being experienced by a particular web server. As a result, such a workload analysis of a system does not provide any insight into the level or location of activity that a network system is likely to experience in the future. However, forecasting user activity patterns is crucial for efficiently deploying and organizing network server resources. Knowledge regarding the relationships between network users can also be used in devising ways to handle the activity patterns that a network system is likely to experience in the future.

BRIEF DESCRIPTION OF THE DRAWINGS

The present disclosure is illustrated by way of example, and not by way of limitation, in the figures of the accompanying drawings, in which.

DETAILED DESCRIPTION

Although the present disclosure is described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense.

A network system (e.g., a messaging system) may provision network server resources, via geographic location and/or logical organization, in order to take advantage of social graph data of network users. The embodiments described herein provide systems and methods for analyzing the activities of network users to obtain social graph data, grouping the users based on the social graph data and provisioning network server resources based on matching server resources to groups of users. These embodiments will be described in relation to mobile wireless communication devices, hereafter referred to as client devices, for sending and receiving electronic messages such as text, images or video and associated servers for receiving and forwarding messages to and from the client devices. It will be appreciated by those skilled in the art, however, that this description is not intended to limit the scope of the described embodiments to the communication devices described below or to a specific form of electronic message. The methods and systems described herein may be applied to any appropriate communication or data processing device and to any appropriate electronic communication format.

Overview

Users of a network, individuals and organizations, may be analyzed as nodes on a social graph. Interdependencies between the users, called ties, can be based on many factors such as frequency of communications and the like. The information from such a social graph may be used for workload forecasting and network capacity planning.

Figure 1:
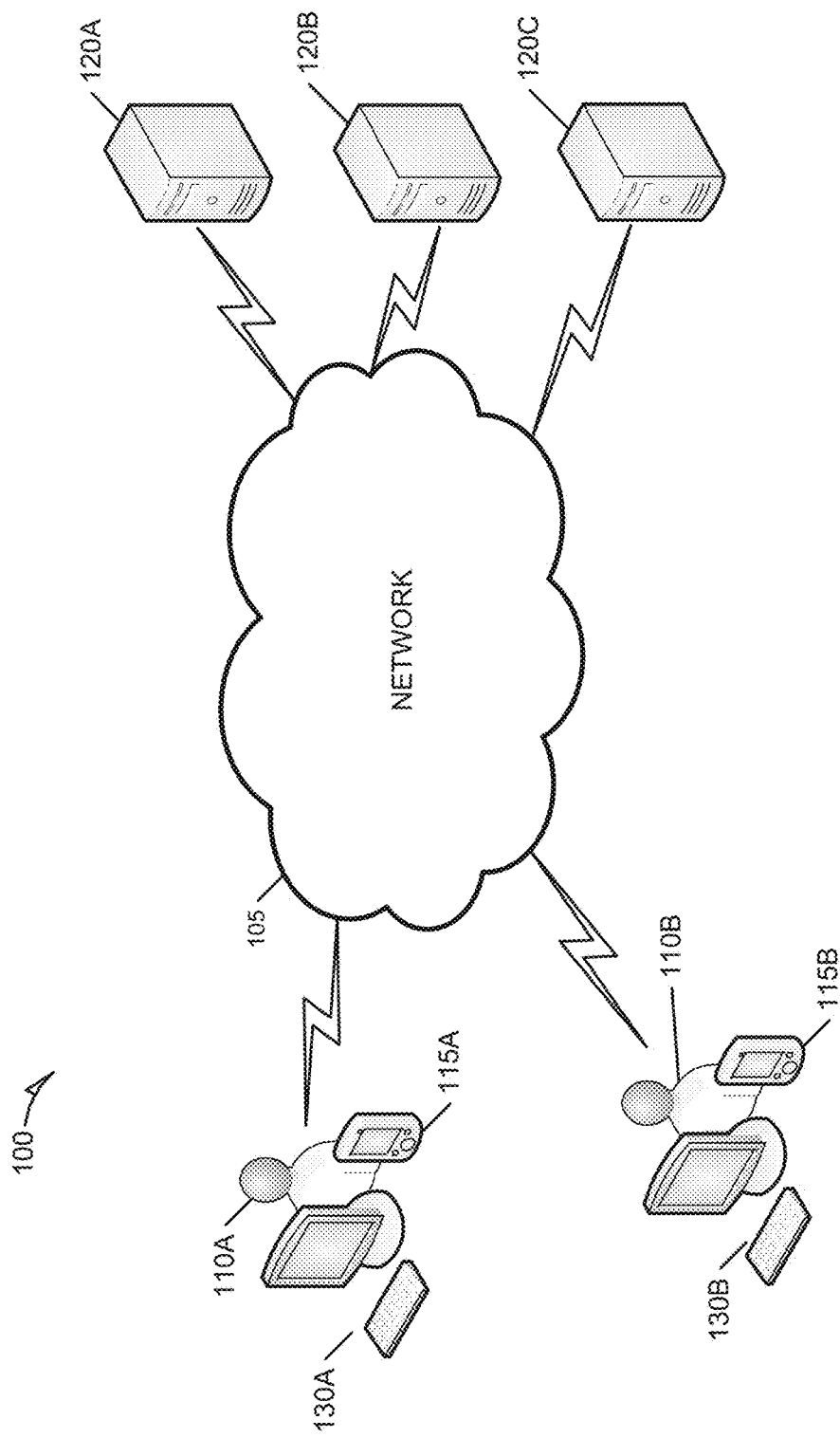
FIG. 1 is a block diagram showing a network system configured to transmit messages over a network consistent with some embodiments.

FIG. 1 is a block diagram showing a network system 100 configured to transmit data over a network 105 (e.g., the Internet) consistent with some embodiments, in an embodiment, network servers 120A, 120B and 120C provides network resources for use by client devices. The client device may be a mobile device 115A or a more static device 130A (e.g., desktop computer) of a user 110A of network 105. The network activity of the users (e.g., 110A) may be monitored and used to generate social graph data associated with each of the users respectively. The social graph data may then be used to cluster the users into groups of tightly connected users, e.g., users with many ties among themselves. Once the groups are identified, data associated with each group is analyzed to obtain a profile for the group, This profile may then be used to match a group to a network server (e.g., 120B) for the most optimal provisioning of network resources.

As mentioned above, the first step is to obtain network activity data for a plurality of network users (110A, 110B, etc.) and generate social graph data associated with each user. It is noted that social graph information regarding network users may also be obtained in other ways, for example from other networks, from partners or via purchases. The social graph data is then used to cluster the users into groups based on, for example, a measure of connectivity between the users. The connectivity may be measured according to how strong the ties between each pair of users are with regard to a selected measurement, such as number of communications transmitted between the user pair. The users (110A, 110B, etc.) may then be clustered using a clustering algorithm which identifies groups of users that are likely to communicate with each other more often over a future period of time. Data associated with these groups of users is then analyzed to obtain group profiles that will be used to match the groups with available network server resources (e.g., 120A, 120B, 120C, etc.) for efficient provisioning.

In some embodiments, the particular connectivity measure used to perform the clustering may be selected to exploit the available social graph data. Depending on the subset of social graph data used, different clustering results can be obtained. For example, users (e.g., 110A, 110B, etc.) can be clustered according to the level of communication between them, the level of similarity of their navigation patterns (e.g., often visit many of the same websites), the level of similarity of their user profiles (e.g., a location of the user), the level of similarity of their user contacts, etc. Each of these clustering measures may result in different groupings of users and can be combined as needed to further cluster the network users. The particular measures used for the clustering may be selected based on which are most important for logically organizing network users into groups for provisioning network server resources in a particular implementation.

In an embodiment, the clustering is performed according to a communication level between pairs of users like 110A and 110B. For this purpose, the number of messages sent between their respective client devices (e.g., 115A and 115B) per a given time period (e.g., per hour, minute, etc.) may be used as the measure from the social graph data for clustering the network users into groups. The clustering may be performed using time series data values (e.g., a sequence of data points, typically consisting of successive measurements made over a time interval) for the selected measurement, or a function of these time series data values for the selected measurement. Once the measurements (e.g., communication level) of social graph data are used to perform the clustering, data associated with the resulting user groups may then be analyzed to obtain group profiles which may be compared to relevant data points used to locate and organize network server resources (e.g., 120A, 120B, 120C, etc.). For example, relevant data points for placing a server may be based on the server's capabilities (e.g., hardware and/or software) and a user group profile that includes values/data with respect to these relevant data points for all of the users associated with the user group may be compared to the server's capabilities to determine if the server should be assigned to the users associated with the group profile. In other words, only servers having sufficient capabilities are assigned to the users associated with this group profile.

In an embodiment, profiling of a user group involves first determining the relevant data points, from the social graph data, upon which the user group profiles will be based. In some embodiments, a location of a user (e.g., 110A), an activity level of a user or a server asset often utilized by a user may be used as the relevant data points to generate the user group profiles for the identified groups of users. In generating the profile for a group, different types of analyses may be performed on the social graph data of the users of a group. Generating a group profile for a group of users may be based on identifying values/data for each of the users, where the values/data are related to any of the relevant data points being used to locate and organize network server resources (e.g., server 120A, 120B, 120C . . . ). For example, user network activity may be monitored to identify values/data that are the most similar to the set of social graph values/data for the users of the group (e.g., the mode), where the values/data of the set are related to any of the relevant data points.

In an embodiment, the profile for a group is generated by simply averaging the values with respect to relevant data points for all the users of a user group. However since an outlying (e.g., with respect to the averaged data points) user (e.g., 110A) of the group may have an associated value for the averaged data point that is far from the group average, the clustering of groups described above may be performed so that it minimizes the maximum difference of values associated with all of the users in a group with respect to the average value of the relevant data points for provisioning network server resources. Furthermore, different profiles may be generated for different recurring time periods, such as day of the week, week of the month, month of the year, etc.

In an embodiment, the profile of each user group may be compared to corresponding data associated with the plurality of servers (e.g., 120A, 120B, 120C, etc.) for the purpose of assigning each user group to at least one of the plurality of servers based on the comparison. For example, if the users (e.g., 110A, 110B, etc.) of a group are located within a specified geographic area then the group might be assigned to access network resources via a server that is closest to the said geographic area. In other examples, the user groups may be assigned to servers based on matching the group to a server based on other relevant data points.

In embodiments, the comparison of user group profiles to corresponding server data includes at least one of: comparing a geographic location associated with the users of a group to a geographic location of a server, of application server(s) 218, as noted above; comparing an activity level (e.g., average number of send/receive actions) associated with the users of a group to a capacity of a server so that the server is able to provision network services to the group without overloading; or comparing a server asset utilized by users of a group to assets available at a server so that user requested assets are available at the server to which a user group is assigned.

System Architecture

Figure 2:
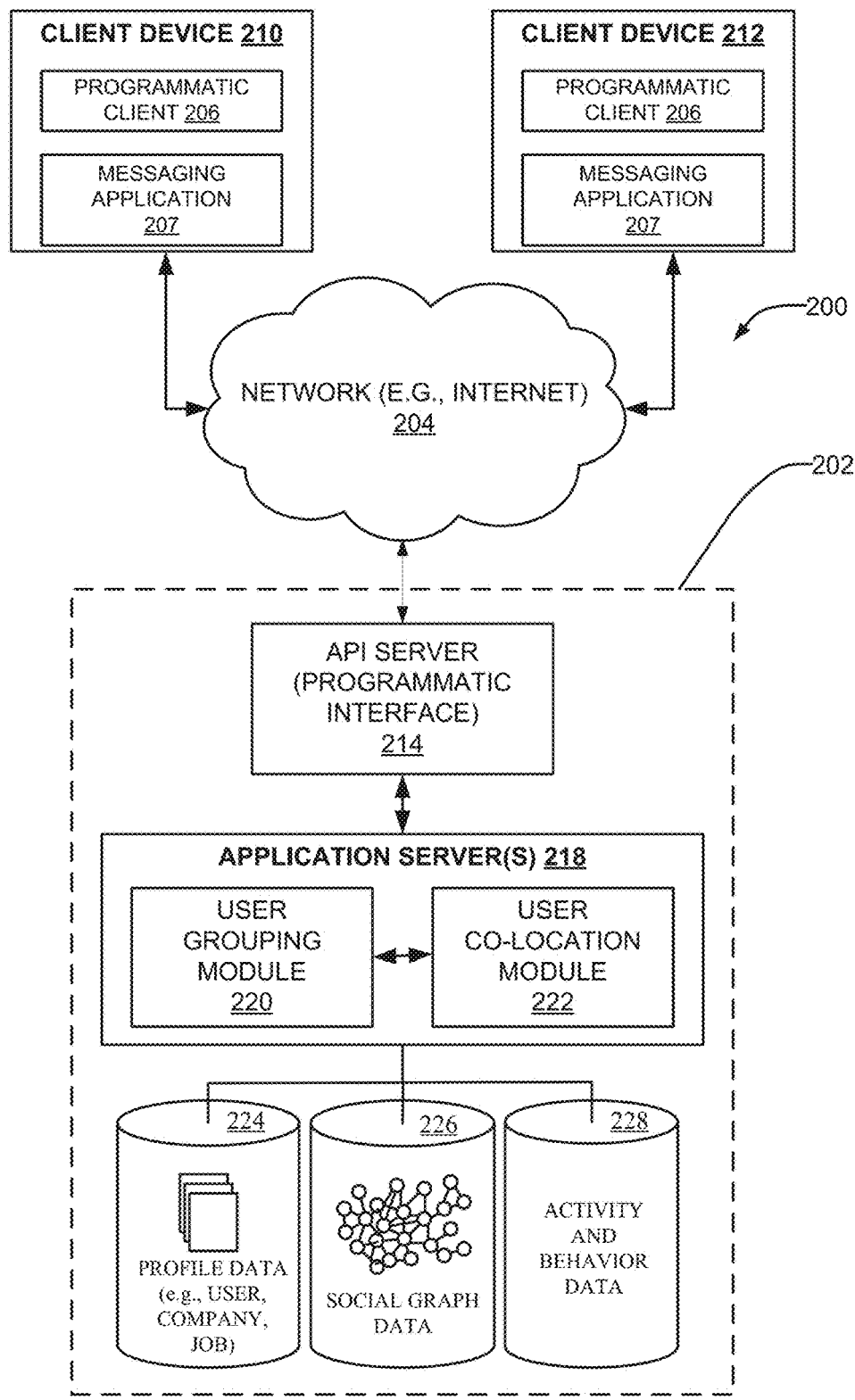
FIG. 2 is a block diagram illustrating an example of a network environment including a server operating a system for allocating network resources for processing and storing messages among users of client devices, consistent with some embodiments.

FIG. 2 is a network diagram depicting a network system 200 having a client-server architecture configured for exchanging data over a network, according to one embodiment. For example, the network system 200 may be a messaging system where clients may communicate and exchange data within the network system 200. The data may pertain to various functions (e.g., sending and receiving text, photo and video communications) and aspects (e.g., publication of blogs and websites) associated with the network system 200 and its users. Although illustrated herein as client-server architecture, other embodiments may include other network architectures, such as peer-to-peer or distributed network environments.

A data exchange platform 202, in an example, includes a user grouping module 220 and a user co-location module 222, and may provide server-side functionality via a network 204 (e.g., the Internet) to one or more client devices. Although described as residing on a server (e.g., application server(s) 218) in some embodiments, in other embodiments some or all of the functions of user grouping module 220 and a user co-location module 222 may be provided by a client device. The one or more clients may include users (e.g., 110A and 110B) that use the network system 200 to exchange data over the network 204. These operations may include transmitting, receiving (communicating), and processing data to, from, and regarding content and users of the network system 200. The data may include, but is not limited to, content and user data such as user profiles, messaging content, messaging attributes, client device information, and geolocation information, among others.

In various embodiments, the data exchanges within the network system 200 may be dependent upon user-selected functions available through one or more client or user interfaces (UIs). The UIs may be associated with a client machine, such as client devices 210, 212 using a programmatic client 206, such as a client application. The programmatic client 206 may be in communication with the user grouping module 220 and a user co-location module 222 at least one of application server(s) 218. The client devices 210, 212 may comprise mobile devices with wireless communication components and applications for sending specific types of electronic messages over network 204 (e.g., messaging application 207).

Turning specifically to the user grouping module 220 and a user co-location module 222, an application program interface (API) server 214 is coupled to, and provides programmatic interface to one or more application server(s) 218 that host the user grouping module 220 and a user co-location module 222. The application server(s) 218 are, in turn, shown to be coupled to one or more database(s) 224, 226 and 228 for storing and/or accessing network data.

The API server 214 communicates and receives data pertaining to messages, among other things, via various user input tools. For example, the API server 214 may send and receive data to and from an application (e.g., via the programmatic client 206) running on another client machine (e.g., client devices 210, 212 or a third party server).

In one example embodiment, the user grouping module 220 provides monitoring mechanisms for users of the client devices 210 and 212 in order to obtain user activity data. The application server(s) 218 can access and view the user activity data from, for example, the activity and behavior database 228.

Application server(s) 218 provide network resources for use by client devices, such as client devices 210 and 212. Each of the client devices 210 and 212 may be a mobile device (e.g., like 115A) or a more static device (e.g., like 130A) of a user (e.g., like 110A) of network 204. The network activity of the users (e.g., 110A) may be monitored via the user grouping module 220 and used to generate social graph data associated with each of the users of the client devices 210 and 212 respectively. The social graph data may then be stored in social graph database 226 and accessed for use in clustering the users of data exchange platform 202 into groups of tightly connected users, e.g., users with many social ties among themselves. Once the groups are identified, data associated with each group is analyzed to obtain a profile for the group. This profile may then be used to match a group to a network server, from application server(s) 218, for the improved provisioning of network resources.

The activities of client devices 210 and 212 may be monitored, for example, via a messaging application 207 residing on each of the devices. The activities of client devices 210 and 212 may also be monitored via application server(s) 218 which may record any user interaction with the application server(s) 218. The network activity data for a plurality of network users (e.g., 110A, 110B, etc.), which may be stored in activity and behavior database 228, is used to generate social graph data associated with each user of a client device such as client device 210. It is noted that social graph information regarding network users may also be obtained in other ways, for example from other networks, from partners or via purchase. It is also noted that user profile data stored in profile database 224 (e.g., names, addresses, phone numbers, affiliations, etc.) may also be used to generate the social graph data.

The social graph data, which may be stored in social graph database 226, is then used by user grouping module 220 to cluster the users into groups based on, for example, a measure of connectivity between the users. The connectivity may be measured according to how strong the ties between each pair of users are with regard to a selected measurement, such as number of communications transmitted between the user pair. It is noted that user profile data stored in profile database 224 may also be used to aid in clustering the users into logical user groups. The users (e.g., 110A, 110B, etc.) may then be clustered using a clustering algorithm which identifies groups of users that are, for example, likely to communicate with each other more often over a future period of time. Data associated with these groups of users is then analyzed to obtain user group profiles that will be used to match the user groups with available network server resources, such as application server(s) 218, for efficient provisioning of network resources.

The particular connectivity measure used to perform the clustering may be selected to exploit the available social graph data. Depending on the subset of social graph data used, different clustering results can be obtained. For example, users (e.g., 110A, 110B, etc.) can be clustered according to: the level of communication between them (so that users that often message each other might be grouped); the level of similarity of their navigation patterns (so that users that often visit the same websites might be grouped (e.g., from social graph database 226)); the level of similarity of their user profiles (so that users that list similar addresses or jobs on their profiles might be grouped (e.g., from profile database 224)); the level of similarity of their user contacts (so that users with substantially overlapping sets of contacts might be grouped), etc. Each of these clustering measures will result in different groupings of users and can be combined as needed to further cluster the network users. The particular measures used for the clustering may be selected, for example, based on which are most important (e.g., activity level) for logically organizing network users into groups for the provisioning of network server resources in a particular implementation.

The clustering of users into user groups may be performed according to a measure of the level of communication between pairs of users like 110A and 110I. For this purpose, the number of messages sent between their respective client devices (e.g., 210 and 212) per hour may be used as the measure from the social graph data for clustering the network users into groups. The clustering may be performed using the time series data values for the selected measurement (e.g. a number of messages sent between a user pair), or a function of these time series data values for the selected measurement (e.g., derivatives of the values). Once the measurements (e.g., inter-user communication level) of social graph data are used to perform the clustering, the resulting user groups are analyzed to obtain group profiles with regard to relevant data points (e.g., geographic location) used to locate and organize network server resources such as application server(s) 218.

The profiling of a user group, via the user grouping module 220, involves first determining the relevant data points (e.g., user location, user job, user network communication levels, user website navigation patterns, user server asset utilization, etc., from the social graph data, upon which the user group profiles will be based. It is noted that user profile data, stored in profile database 224, for the users of a user group may also be used to generate the user group profile. The relevant data points may be selected based on their respective importance in determining how to deploy and apportion network server resources such as application server(s) 218. In some embodiments, a location of a user (e.g., 110A), an activity level of a user and/or a server asset often utilized by a user may be used as the relevant data points to generate the user group profiles for the identified groups of users. In generating the profile for a group, different types of analyses may be performed on the social graph data (e.g., in social graph database 226) associated with the users of a group. Generating a group profile for a group of users may be based on identifying values/data for each of the users, where the values/data are related to any of the relevant data points being used to locate and organize network server resources (e.g., application server(s) 218). For example, user network activity may be monitored to identify values/data that are the most similar to the set of social graph values/data for the users of the group (e.g., the mode), where the values/data of the set are related to any of the relevant data points.

The profile for a group may also be generated by simply averaging the values with respect to the relevant data points for all the users (e.g., 110A and 110B) of a user group. However since an outlying (e.g., with respect to the averaged data points) user (e.g., 110A) of the group may have an associated value for an averaged data point that is far from the group average, the clustering of groups described above may be performed so that it minimizes the maximum difference of values associated with all of the users in a group with respect to the average value of the relevant data points for provisioning network server resources. Furthermore, different user group profiles may be generated for different recurring time periods, such as day of the week, week of the month, month of the year, etc.

The profile of each user group may then be compared, by the user co-location module 222, to corresponding data associated with the application server(s) 218 for the purpose of assigning (for the provision of network resources) each user group to at least one of the application server(s) 218 based on the comparison. For example, if the users (e.g., 110A and 110B) of a group are located within a specified geographic area, then the group might be assigned to access network resources via a server, of application server(s) 218, that is closest to the said specified geographic area. In other examples, the user groups may be assigned to servers, of application server(s) 218, based on matching the user group to a server based on other relevant data points.

The comparison of user group profiles to corresponding server data, of application server(s) 218, includes at least one of: comparing a geographic location associated with the users (e.g., 110A and 110B) of a group to a geographic location of a server as noted above; comparing an activity level (e.g., average send/receive) associated with the users of a group to a capacity of a server so that the server is able to provision network services to the group without overloading; or comparing a server asset utilized by users of a group to assets available at a server so that user requested assets are certain to be available at the server to which a user group is assigned for requesting network resources.

User Grouping and Profiling

Figure 3:
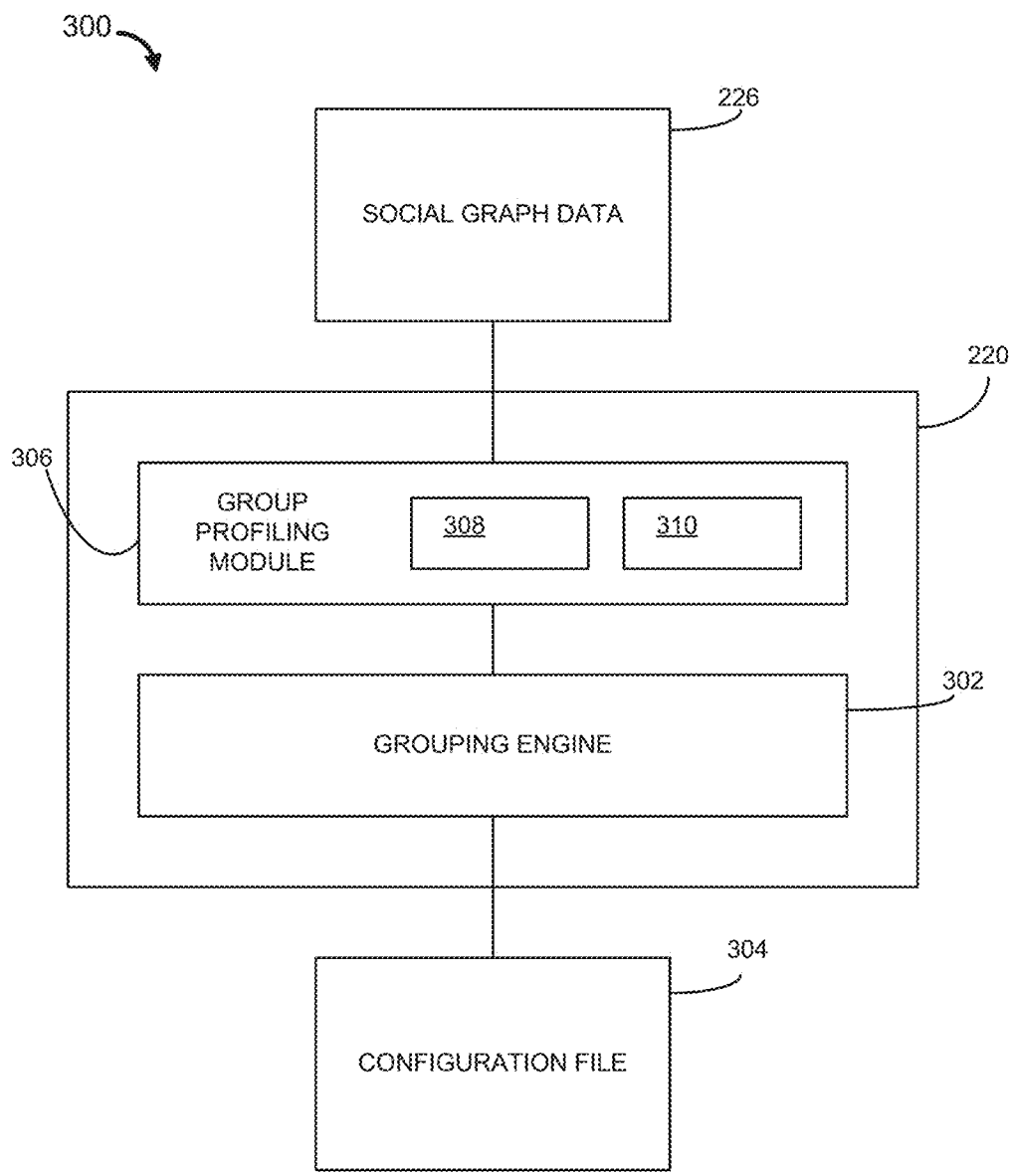
FIG. 3 is a block diagram showing some of the functional components or modules that make up the user grouping module, in accordance with an example embodiment.

FIG. 3 is a block diagram 300 showing some of the functional components or modules that make up the user grouping module 220, in accordance with an example embodiment. As shown in FIG. 3, the social graph database 226 is accessed by the user grouping module 220 so as to cluster the users into groups based on, for example, a measure of connectivity between the users. The grouping engine 302 of user grouping module 220 may be programmed via a configuration file 304 to measure user connectivity according to how strong the social graph ties between each pair of users (e.g., 110A and 110B) are with regard to a specified measurement, such as number of communications transmitted between the user pair. It is noted that user profile data stored in profile database 224 may also be used to aid grouping engine 302 in clustering the users into logical user groups. The users may then be clustered by grouping engine 302 using a clustering algorithm which identifies groups of users that are, for example, likely to communicate with each other more often over a future period of time. Data associated with these groups of users (e.g., in databases 224, 226 or 228) is then analyzed by group profiling module 306 to obtain user group profiles (which may be stored in profile database 224) that will be used to match the user groups with available network server resources, such as application server(s) 218, for efficient provisioning of network resources.

The particular connectivity measure used to perform the clustering by grouping engine 302 may be specified via configuration file 304 so as to exploit the available social graph data and so as to facilitate provisioning of network server resources such as application server(s) 218. Depending on the subset of social graph data used, different clustering results can be obtained. For example, users (e.g., 110A and 110B) can be clustered according to the level of communication between them as noted above, the level of similarity of their navigation patterns (e.g., from social graph database 226), the level of similarity of their user profiles (e.g., from profile database 224), the level of similarity of their user contacts, or according to other such measures. Each of these clustering measures will result in different groupings of users and can be combined as needed to further cluster the network users.

The clustering of users into user groups may be performed by grouping engine 302 according to a measure of the level of communication between pairs of users like 110A and 110B. For this purpose, the number of messages sent between their respective client devices (e.g., 210 and 212) per hour may be used (e.g., as recorded via messaging application 207) for the measure from the social graph data for clustering the network users into groups. Once the measurements (e.g., inter-user communication level) of social graph data are used to perform the clustering by grouping engine 302, data associated with the resulting user groups is analyzed by group profiling module 306 to obtain group profiles with regard to relevant data points (e.g., geographic location) used to locate and organize network server resources such as application server(s) 218.

The profiling of a user group, via the group profiling module 306, involves first determining the relevant data points, from the social graph data, upon which the user group profiles will be based, This information may be specified via the configuration file 304. It is noted that user profile data in profile database 224 may also be used by the group profiling module 306 to generate the user group profile. The relevant data points may be specified based on their respective importance in determining how to deploy and apportion network server resources such as application server(s) 218. In some embodiments, a location of a user (e.g., 110A), an activity level of a user and/or a server asset often utilized by a user may be used as the relevant data points to generate the user group profiles for the identified groups of users. In generating the profile for a group, different types of analyses may be performed, by grouping module 306, on the social graph data (e.g., in social graph database 226) associated with the users of a group. Generating a group profile for a group of users may be based on identifying values/data for each of the users, where the values/data are related to any of the relevant data points being used to locate and organize network server resources (e.g., application server(s) 218). For example, user network activity may be monitored to identify values/data that are the most similar to the set of social graph values/data for the users of the group (e.g., the mode), where the values/data of the set are related to any of the relevant data points.

In another example, the profile for a group may be generated by group profiling module 302 by simply averaging the values with respect to the relevant data points for all the users (e.g., 110A and 110B) of a user group. However since an outlying (e.g., with respect to the averaged data points) user (e.g., 110A) of the group may have an associated value for an averaged data point that is far from the group average, the clustering of groups described above may be performed by group profiling module 302 so that it minimizes the maximum difference of values associated with all of the users in a group with respect to the average value of the relevant data points for provisioning network server resources. Furthermore, different user group profiles may be generated by group profiling module 302 for different recurring time periods, such as day of the week, week of the month, month of the year, or other such recurring time periods.

As illustrated in the example of FIG. 3, the group profiling module 306 includes a data point retrieval module 308 and a data point derivation module 310. The data point retrieval module 308 of the group profiling module 306 may retrieve various user social graph (or user profile) data points from social graph database 226 (or profile database 224), such that these retrieved data points may be used to determine the similarity of any two users of data exchange platform 202 with respect to relevant data points for provisioning network server resources such as application server(s) 218 (e.g., geographic location). These social graph (or user profile) data points retrieved from social graph database 26 and/or profile database 224 may then also be used by the data point derivation module 310 to derive further profile data points. For example, the data point derivation module 310 may derive certain group profile data points (e.g., location) based on the data extracted by the data point retrieval module 308 (e.g., telephone number).

In addition to retrieving and/or deriving various user group profile data points, the group profiling module 306 may include logic to normalize or standardize certain user group profile data points. For instance, in some examples, a group profile will include data regarding a common job held by a group of users in the form of a profile "job title" data point. However, because job titles may vary from one company to the next and from one industry to the next, job titles may need to be normalized or standardized. For example, the simple job title, "analyst" may have very different meanings in different industries. By normalizing and/or standardizing the job titles and then providing the standardized and/or normalized job title for the user group profile, the user co-location module may make meaningful comparisons to corresponding server data (e.g., does a server provide resources accessed by users with the job title), and thereby provide network server resources such as application server(s) 218 according to the comparison.

User Co-Location

Figure 4:
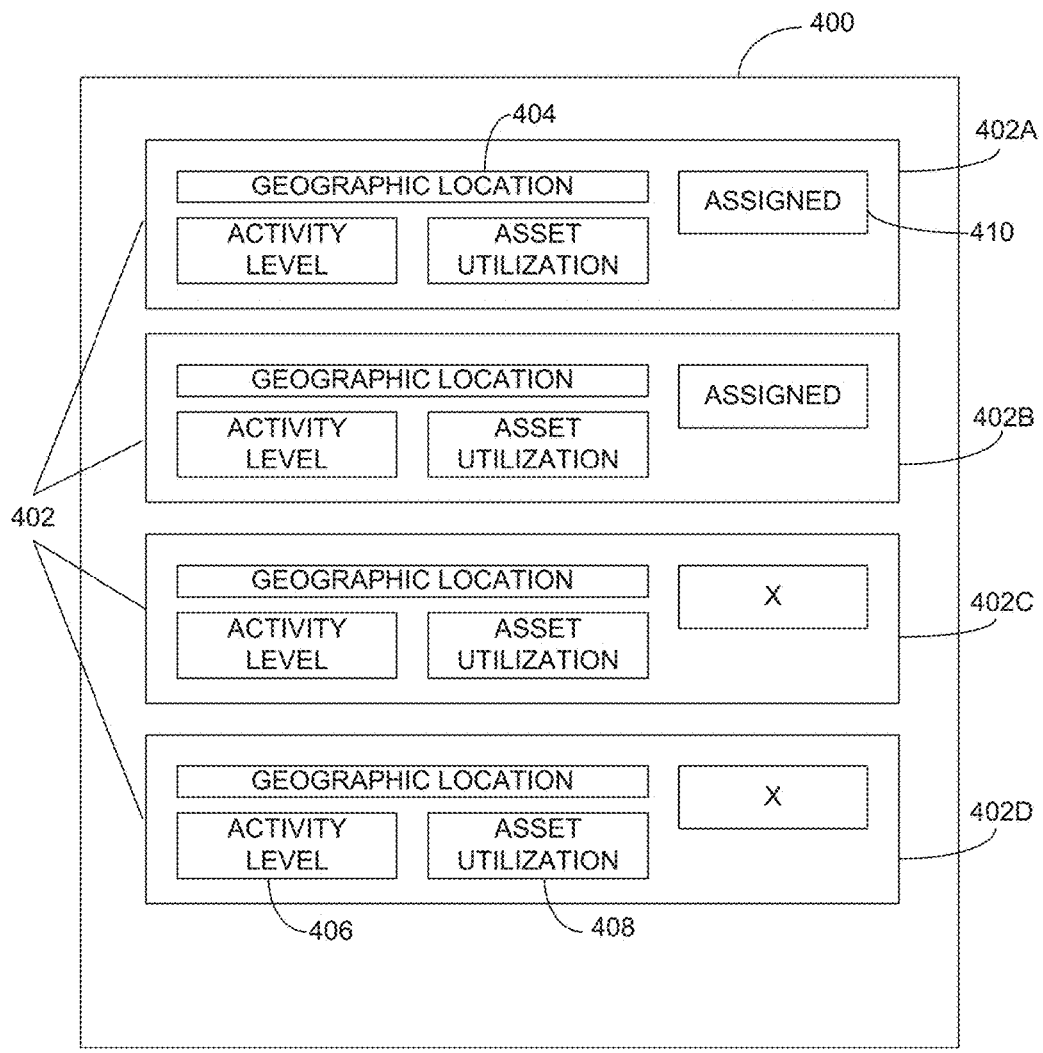
FIG. 4 is a block diagram illustrating an example grouping of network users for co-location on servers providing network resources.

FIG. 4 is a block diagram 400 illustrating an example grouping of network users, according to group profiles 402, for co-location on servers (e.g., application server(s) 218) providing network resources. The profiles (402A-402D) of each user group is compared, by the user co-location module 222, to corresponding data associated with the application server(s) 218 for the purpose of assigning (for the provision of network resources) each user group to at least one of the application server(s) 218 based on the comparison. For example, if a group profile 402A indicates that the users of a group are located within a specified geographic area at field 404, then the group might be assigned by the user co-location module 222 to access network resources via a server of application server(s) 218 that is closest to the said specified geographic area. If a group profile 402B indicates that a group of users has already been assigned to one of the application server(s) 218 at field 410, then the group will be ignored by the user co-location module 222 when determining the allocation and provisioning of network server resources. In other example embodiments, the user groups may be assigned by co-location module 222, to servers of application server(s) 218, based on matching the user group to a server based on other relevant data points.

The comparison of user group profiles to corresponding server data, of application server(s) 218, may include one of: comparing a geographic location associated with the users (e.g., 110A and 110B) of a group (e.g., field 404) to a geographic location of a server as noted above; comparing an activity level (e.g., field 406) associated with the users of a group to a capacity of a server so that the server is able to provision network services to the group without overloading; or comparing a server asset utilized by users of a group (e.g., field 408) to assets available at a server so that user requested assets are certain to be available at the server to which a user group is assigned for requesting network resources.

Methods

Figure 5:
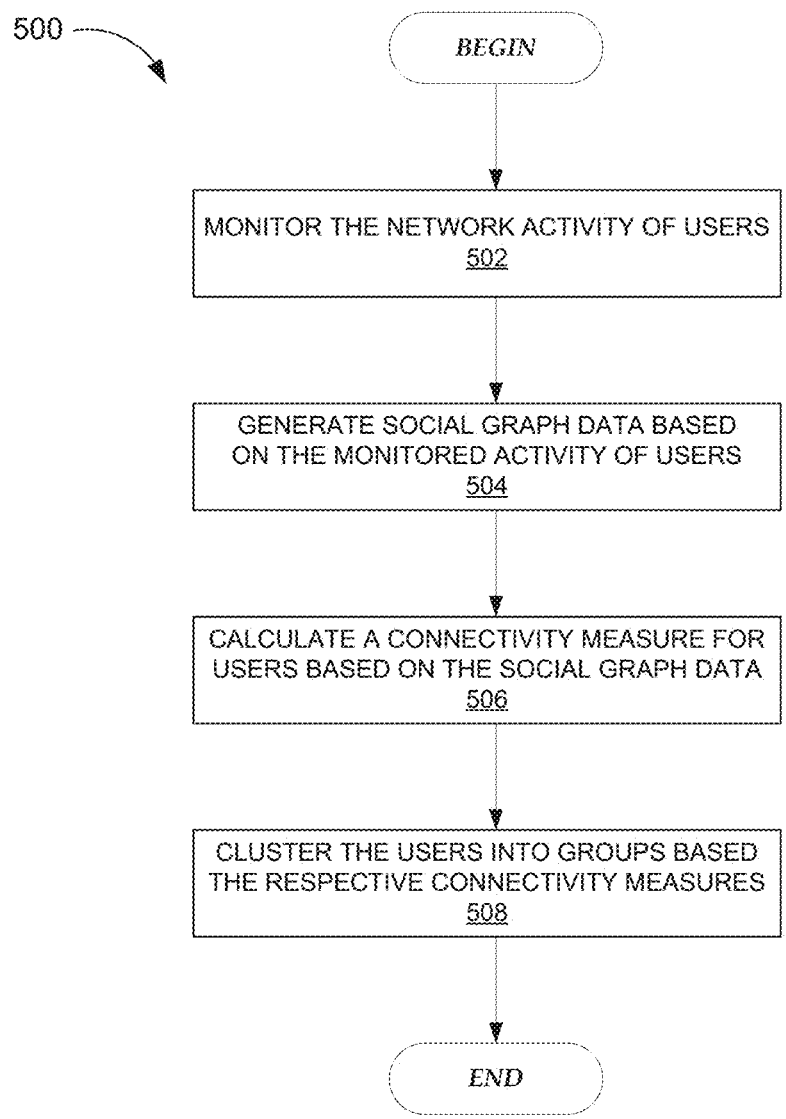
FIG. 5 is a flow diagram illustrating one example embodiment of an operation of the user grouping module.

FIG. 5 is a flow diagram 500 illustrating one example embodiment of an operation of the user grouping module 220. At operation 502, the network activity of a plurality of network users is monitored. The user activities may be monitored, for example, via a messaging application (e.g., messaging application 207) residing on client devices of the users. The user activities may also be monitored via network servers (e.g., application server(s) 218) which may record any user interaction with the network servers. The network activity data for the plurality of network users may be stored in user activity database (e.g., activity and behavior database 228). At operation 504, the monitored user activity is used to generate social graph data for each network user. The user social graph data may include data regarding interdependencies between the users that are based on many factors such as frequency of communications.

At operation 506, a connectivity measure is calculated for each pair of users based on the generated social graph data. The particular connectivity measure may be selected to exploit the available social graph data. For example, the social graph data of a pair of network users (e.g., 110A, 110B, etc.) can be examined in regard to a measure of the level of communication between the pair of users, the level of similarity of the pair's navigation patterns, or the level of similarity of the pair's user contacts, etc. Each of these measures will result in different groupings of users and can be combined as needed to further group the network users. Finally at operation 508, the network users are clustered into groups based on the connectivity measures for calculated for each pair of users. If the clustering is performed according to a communication level between pairs of users like 110A and 110B, the number of messages sent between them per hour may be used as the measure from the social graph data for clustering the network users into groups. Once the measurements (e.g., communication level) of social graph data are used to perform the clustering, data associated with the resulting user groups may then be analyzed to obtain group profiles as explained below with respect to FIG. 6.

Figure 6:
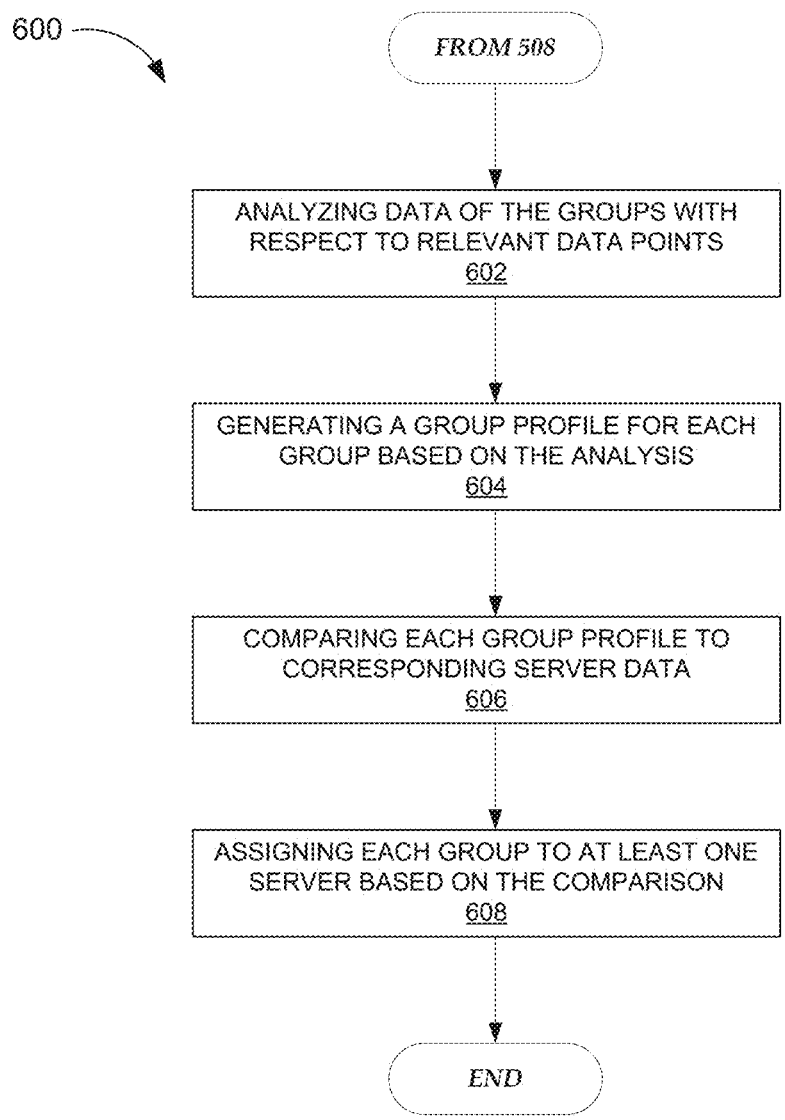
FIG. 6 is a flow diagram illustrating one example embodiment of an operation of the group profiling module and the user co-location module.

FIG. 6 is a flow diagram 600 illustrating one example embodiment of an operation of the group profiling module 306 and the user co-location module 222. At operation 602, data associated with the user groups may be analyzed with respect to a set of relevant data points. In some embodiments, a location of a user (e.g., 110A), an activity level of a user or a server asset often utilized by a user may be analyzed as the relevant data points that will then be used to generate the user profiles for the identified groups of users. Different types of analyses may be performed on the social graph data (or user profile data) associated with the users of a group. For example, in certain embodiments, an average of certain values (e.g., a number of messages sent) may be calculated. At operation 604, a group profile for each of the groups may be generated based on the analysis of the user groups. For example, a group profile for a group may be based on identifying values/data with respect to each of the relevant data points, wherein the identified values/data are the most similar to the associated values/data with respect to each of the relevant data points for all of the members of the group.

At operation 606, each group profile may be compared to corresponding data associated with the plurality of servers, such as application server(s) 218. For example, if the data associated with the users of a group indicates that the users are located within a specified geographic area then the group might be assigned to access network resources via a server of application server(s) 218 that is closest to that geographic area. In other examples, the user groups may be assigned to servers based on matching the group to a server based on other relevant data points. Finally at operation 608, each user group may be assigned to at least one of the application server(s) 218 based on the comparison. For example, a user group may be assigned to a server based on comparing a geographic location associated with the users of a group to a geographic location of a server as noted above; comparing an activity level (e.g., average send/receive) associated with the users of a group to a capacity of a server so that the server is able to provision network services to the group without overloading; or comparing a server asset utilized by users of a group to assets available at a server so that user requested assets are available at the server to which a user group is assigned.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically, constructed, permanently configured (e.g., hardwired), or temporarily or transitorily configured (e.g., programmed) to operate in a certain manner or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respectively different hardware-implemented modules at different times. Software may, accordingly, configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via the network 104 (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product (e.g., a computer program tangibly embodied in an information carrier, e.g., in a machine-readable medium for execution by, or to control the operation of, data processing apparatus, e.g., a programmable processor, a computer, or multiple computers).

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed in various example embodiments.

Example Computer System

Figure 7:
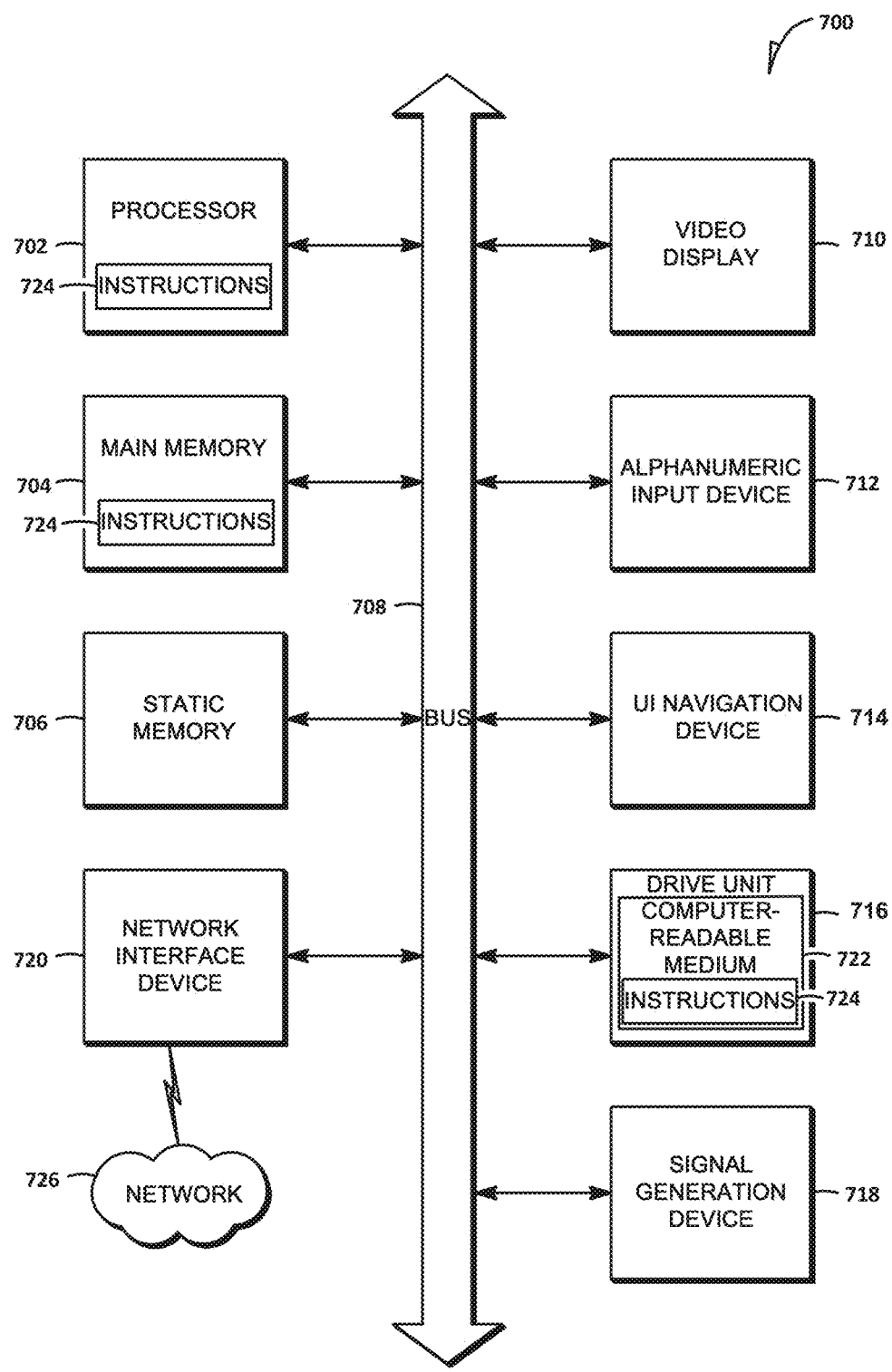
FIG. 7 is a diagrammatic representation of machine, in the example form of a computer system, within which a set of instructions may be executed to cause the machine to perform one or more of the methodologies discussed herein.

FIG. 7 shows a diagrammatic representation of a machine in the example form of a machine or computer system 700 within which a set of instructions 724 may be executed causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing a set of instructions 724 (sequential or otherwise) that specify actions to be taken by that machine. Further, while only a single machine is illustrated, the term "machine" shall also be taken to include any collection of machines that individually or jointly execute a set (or multiple sets) of instructions 724 to perform any one or more of the methodologies discussed herein.

The example computer system 700 includes a processor 702 (e.g., a central processing unit (CPU), a graphics processing unit (GPU), or both), a main memory 704, and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a UI navigation device 714 (e.g., a mouse), a drive unit 716, a signal generation device 718 (e.g., a speaker), and a network interface device 720.

The drive unit 716 includes a computer-readable medium 722 on which is stored one or more sets of data structures and instructions 724 (e.g., software) embodying or used by any one or more of the methodologies or functions described herein. The instructions 724 may also reside, completely or at least partially, within the main memory 704 or within the processor 702 during execution thereof by the computer system 700, with the main memory 704 and the processor 702 also constituting machine-readable photo.

The instructions 724 may further be transmitted or received over a network 726 via the network interface device 720 utilizing any one of a number of well-known transfer protocols (e.g., HTTP).

While the computer-readable medium 722 is shown in an example embodiment to be a single medium, the term "computer-readable medium" should be taken to include a single medium or multiple photo (e.g., a centralized or distributed database, and/or associated caches and servers) that store the one or more sets of instructions 724. The term "computer-readable medium" shall also be taken to include any medium that is capable of storing, encoding, or carrying a set of instructions 724 for execution by the machine that cause the machine to perform any one or more of the methodologies of the present disclosure, or that is capable of storing, encoding, or carrying data structures used by or associated with such a set of instructions 724. The term "computer-readable medium" shall, accordingly, be taken to include, but not be limited to, solid-state memories, optical photo, and magnetic photo.

Furthermore, the machine-readable medium is non-transitory in that it does not embody a propagating signal. However, labeling the tangible machine-readable medium "non-transitory" should not be construed to mean that the medium is incapable of movement—the medium should be considered as being transportable from one physical location to another. Additionally, since the machine-readable medium is tangible, the medium may be considered to be a machine-readable device.

Example Mobile Device

Figure 8:
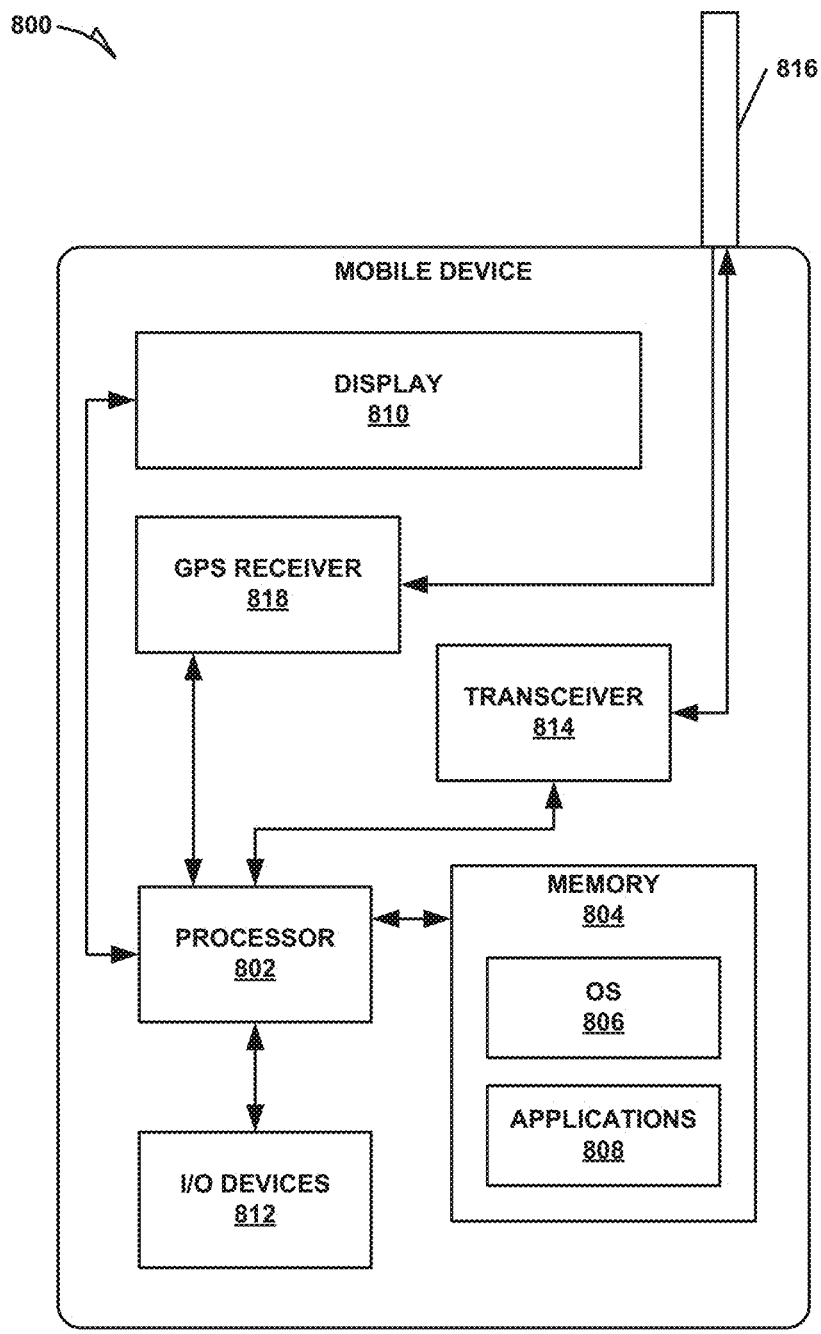
FIG. 8 is a block diagram illustrating a mobile device, according to an example embodiment.

FIG. 8 is a block diagram illustrating a mobile device 800, according to an example embodiment. The mobile device 800 may include a processor 802. The processor 802 may be any of a variety of different types of commercially available processors 802 suitable for mobile devices 800 (for example, an XScale architecture microprocessor, a microprocessor without interlocked pipeline stages (MIPS) architecture processor, or another type of processor 802). A memory 804, such as a random access memory (RAM), a flash memory, or another type of memory, is typically accessible to the processor 802. The memory 804 may be adapted to store an operating system (OS) 806, as well as applications 808, such as a mobile location enabled application that may provide location-based services (LBSs) to a user. The processor 802 may be coupled, either directly or via appropriate hardware, to a display 810 and to one or more input/output (I/O) devices 812, such as a keypad, a touch panel sensor, a microphone, and the like. Similarly, in some embodiments, the processor 802 may be coupled to a transceiver 814 that interfaces with an antenna 816. The transceiver 814 may be configured to both transmit and receive cellular network signals, wireless data signals, or other types of signals via the antenna 816, depending on the nature of the mobile device 800. Further, in some configurations, a GPS receiver 818 may also make use of the antenna 816 to receive GPS signals.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

Such embodiments of the inventive subject matter may be referred to herein, individually or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method comprising:
monitoring, using one or more processors, network activity of a plurality of users of a communication network;
generating social graph data for each user in the plurality of users based on the monitored network activity;
calculating a connectivity measure between each pair of users in the plurality of users based on the social graph data, the connectivity measure comprising a level of communication between users in each pair of users, wherein the level of communication includes a frequency of communication between the users in each pair of users;
identifying a geographic area associated with each of the plurality of users;
clustering the plurality of users into a plurality of groups based on the connectivity measures between each pair of users and based on the geographic area associated with each of the plurality of users; and
selecting a plurality of servers to be assigned to the plurality of groups, respectively,
wherein selecting a first server included in the plurality of servers to be associated to a first group included in the plurality of groups includes:
selecting the first server that is at least one of: within the geographic area associated with the first group, having a capacity to support an activity level associated with the users in the first group, or having assets available that are utilized by the users in the first group, and
causing mobile devices associated with the users in the first group to access network resources from the first server.

2. The method of claim 1, wherein the connectivity measure comprises one or more of: a level of similarity of navigation patterns between each pair of users, a level of similarity of user profiles between each pair of users, and a level of similarity of user contacts between each pair of users.

3. The method of claim 1, further comprising:
comparing one or more of activity level data and asset utilization data for each of the plurality of groups to corresponding one or more of activity level and asset utilization data associated with each of the plurality of servers.

4. The method of claim 3, wherein the one or more of the activity level data and asset utilization data for each of the plurality of groups is an average of the one or more of the activity level data and asset utilization data for users included in each of the plurality of groups.

5. A system comprising:
a processor; and
memory coupled to the processor and storing instructions that, when executed by the processor, cause the system to:
monitor network activity of a plurality of users of a communication network;
generate social graph data for each of the users based on the monitored activity;
calculate a connectivity measure between each pair of users in the plurality of users based on the social graph data, the connectivity measure comprising a level of communication between users in each pair of users, wherein the level of communication includes a frequency of communication between the users in each pair of users;
identify a geographic area associated with each of the plurality of users;
cluster the plurality of users into a plurality of groups based on the connectivity measures between each pair of users and based on the geographic area associated with each of the plurality of users; and
select a plurality of servers to be assigned to the plurality of groups, respectively,
wherein to select a first server included in the plurality of servers to be associated to a first group included in the plurality of groups includes to:
select the first server that is at least one of: within the geographic area associated with the first group, having a capacity to support an activity level associated with the users in the first group, or having assets available that are utilized by the users in the first group, and
to cause mobile devices associated with the users in the first group to access network resources from the first server.

6. The system of claim 5, wherein the connectivity measure comprises one or more of: a level of similarity of navigation patterns between each pair of users, a level of similarity of user profiles between each pair of users, and a level of similarity of user contacts between each pair of users.

7. The system of claim 5, wherein the memory further stores instructions for causing the system to:
compare one or more of activity level data and asset utilization data for each of the plurality of groups to corresponding activity level and asset utilization data associated with each of the plurality of servers.

8. The system of claim 7, wherein the one or more of the activity level data and asset utilization data for each of the plurality of groups is an average of the one or more of the activity level data and asset utilization data for users included in each of the plurality of groups.

9. A non-transitory computer-readable medium storing instructions that, when executed by a computer system, cause the computer system to perform operations comprising:
monitoring network activity of a plurality of users of a communication network;
generating social graph data for each user in the plurality of users based on the monitored activity;
calculating a connectivity measure between each pair of users in the plurality of users based on the social graph data, the connectivity measure comprising a level of communication between users in each pair of users, wherein the level of communication includes a frequency of communication between the users in each pair of users;
clustering the plurality of users into a plurality of groups based on the connectivity measures between each pair of users and based on a geographic area associated with each of the plurality of users; and
selecting a plurality of servers to be assigned to the plurality of groups, respectively,
wherein selecting a first server included in the plurality of servers to be associated to a first group included in the plurality of groups includes:
selecting the first server that is at least one of: within the geographic area associated with the first group, having a capacity to support an activity level associated with the users in the first group, or having assets available that are utilized by the users in the first group, and
causing mobile devices associated with the users in the first group to access network resources from the first server.

10. The computer-readable medium of claim 9, wherein the connectivity measure comprises one or more of: a level of similarity of navigation patterns between each pair of users, a level of similarity of user profiles between each pair of users, and a level of similarity of user contacts between each pair of users.

11. The computer-readable medium of claim 10, the operations further comprising:
comparing one or more of activity level data and asset utilization data for each of the plurality of groups to corresponding one or more of activity level and asset utilization data associated with each of the plurality of servers.

12. The computer-readable medium of claim 11, wherein the one or more of the activity level data and asset utilization data for each of the plurality of groups is an average of the one or more of the activity level data and asset utilization data for users included in each of the plurality of groups.

* * * * *

UNITED STATES PATENT AND TRADEMARK OFFICE
CERTIFICATE OF CORRECTION

PATENT NO. : 10,223,397 B1
APPLICATION NO. : 14/658115
DATED : March 5, 2019
INVENTOR(S) : Sehn et al.

Page 1 of 1

It is certified that error appears in the above-identified patent and that said Letters Patent is hereby corrected as shown below:

On the Title Page

On page 6, in Column 2, item (56) under "Other Publications", Line 15, delete "Serical" and insert --Serial-- therefor In the Claims In Column 18, Line 38, in Claim 10, before "computer-readable", insert --non-transitory--

In Column 18, Line 44, in Claim 11, before "computer-readable", insert --non-transitory--

In Column 18, Line 51, in Claim 12, before "computer-readable", insert --non-transitory--

Signed and Sealed this
Twenty-first Day of April, 2020

Andrei Iancu
*Director of the United States Patent and Trademark Office*